United States Patent [19]
Lo

[11] Patent Number: 5,397,901
[45] Date of Patent: Mar. 14, 1995

[54] FORMING CHARGES IN A FLUID AND GENERATION OF A CHARGED BEAM

[75] Inventor: Shui-Yin Lo, Pasadena, Calif.

[73] Assignee: American Technologies, Inc., Monrovia, Calif.

[21] Appl. No.: 177,669

[22] Filed: Jan. 4, 1994

Related U.S. Application Data

[63] Continuation of Ser. No. 893,469, Jun. 2, 1992, abandoned, which is a continuation of Ser. No. 692,381, Apr. 25, 1991, abandoned, which is a continuation-in-part of Ser. No. 537,444, Jun. 12, 1990, Pat. No. 5,173,610.

[51] Int. Cl.$^6$ ............................................. H01J 37/08
[52] U.S. Cl. ................................ 250/424; 250/423 R; 250/423 F
[58] Field of Search ............... 250/424, 423 R, 423 F, 250/288, 423 P; 315/111.81; 313/359.1

[56] References Cited

U.S. PATENT DOCUMENTS

| | | | |
|---|---|---|---|
| 2,809,314 | 10/1957 | Herb | 250/423 F |
| 3,233,404 | 2/1966 | Huber et al. | 250/423 F |
| 4,209,696 | 6/1980 | Fite | 250/281 |
| 4,328,667 | 5/1982 | Valentian | 250/423 F |
| 4,559,096 | 12/1985 | Friedman et al. | 437/105 |
| 4,596,687 | 6/1986 | Dagenhart | 250/251 |
| 4,638,217 | 1/1987 | Okubo et al. | 250/423 F |
| 4,755,344 | 7/1988 | Friedman et al. | 250/423 R |
| 4,940,893 | 7/1990 | Lo | 250/423 R |
| 5,173,610 | 12/1992 | Lo | 250/424 |

FOREIGN PATENT DOCUMENTS
8908972  9/1989  WIPO .

OTHER PUBLICATIONS

Physical Review Letters, vol. 64, No. 12, 19 Mar. 1990, (New York, US) P. M. Echenique et al.: "Cluster-impact fusion", pp. 1413-1416, see p. 1412, left-hand column (cited in the appln.).

Nuclear Instruments & Methods in Physics Research, Section B, vol. 37/38, No. 2, Feb. 1989 (Amsterdam, NL) J. Gspann: "High-Intensity ionized cluster beams of large metal clusters", pp. 775-778, see page 775, FIG. 1.

International Journal of Mass Spectrometry and Ion Processes, vol. 90, No. 1, 10 May 1989, Elsevier Science Publishers B.V. (Amsterdam, NL) Masahiko Tsuchiya et al.: "Clusters of water under atmospheric pressure studied by field ionization and liquid ionization mass spectrometry", pp. 55-70, see pp. 55-56; FIGS. 1, 2; p. 59, last paragraph; p. 66, paragraphs 1-2.

*Primary Examiner*—Bruce C. Anderson
*Attorney, Agent, or Firm*—Ladas & Parry

[57] ABSTRACT

A method of charging a fluid beam comprising passing a fluid from an area of first pressure to an area of second pressure, the second pressure being lower than the first pressure, and charging said fluid so that molecules of the fluid may be accelerated in the area of second pressure, so as to form a charged beam, wherein the charging imparts sufficient charge to the fluid as to achieve a charge density greater than $10^{14}$ charge per $cm^3$ within the fluid.

47 Claims, 10 Drawing Sheets

$\mu = 4.6 \times 10^{-5}$ m²/V-s
$a = 30$ nm
$b = 10 \mu$m
$E_f = 5.5$ eV
$W = 4.5$ eV

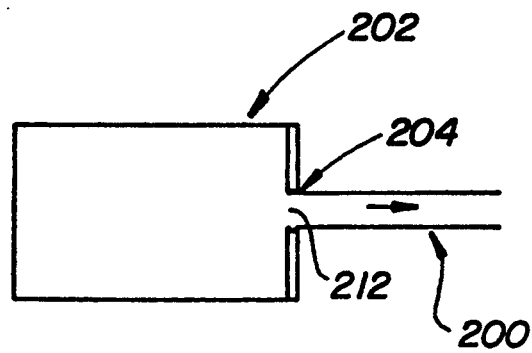
FIG.8a
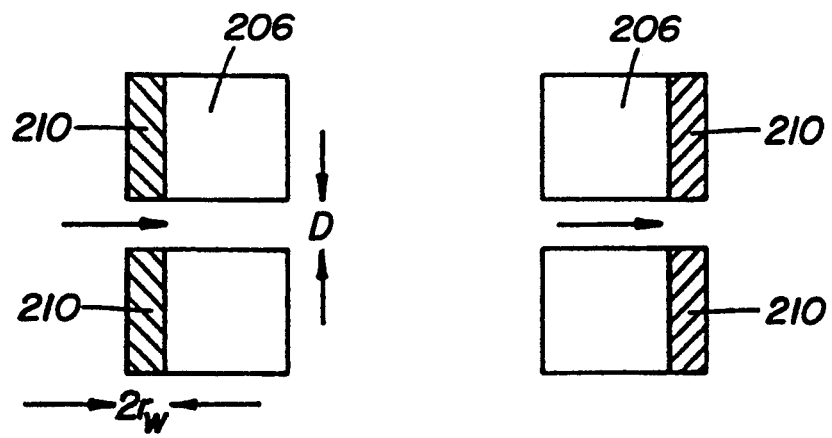
FIG.8b
FIG.8c
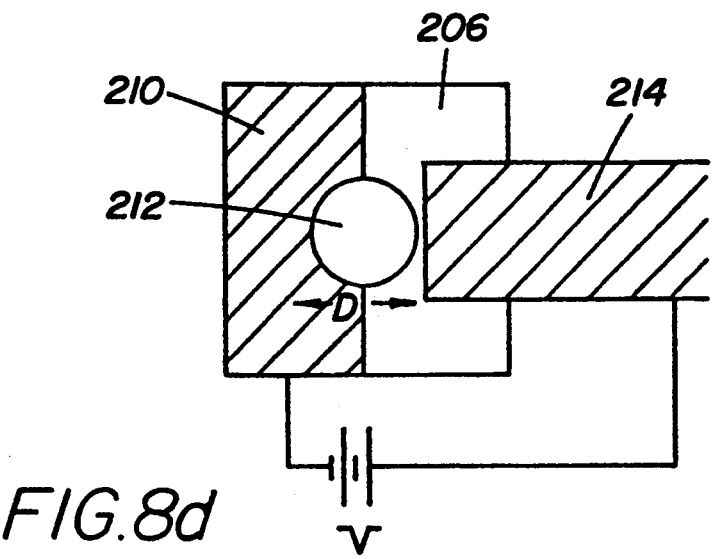
FIG.8d

FORMING CHARGES IN A FLUID AND GENERATION OF A CHARGED BEAM

This is a continuation of U.S. Ser. No. 07/893,469, filed on Jun. 2, 1992, abandoned, which is a continuation of U.S. Ser. No. 07/692,381, filed on Apr. 25, 1991, abandoned, which is a continuation in part of U.S. Ser. No. 07/537,444, filed Jun. 12, 1990, U.S. Pat. No. 5,173,610.

BACKGROUND OF THE INVENTION

The inventor teaches in U.S. Ser. No. 169,648 and in U.S. Ser. No. 112,842 methods for forming a coherent beam and a coherent cluster beam of bosons having mass. In these applications which are incorporated herein by reference, it is disclosed that these beams may be charged by exposing them to charged particles and, as such, accelerated by an applied voltage. Cluster formation from gas, supersaturated gas and superfluid helium, coherency of helium (helium being comprised of bosons having mass), and accelerating particles is well known in the art. The reader is referred to: U.S. Pat. No. 4,755,344, Friedman, Jul. 5, 1988; "Cluster-Impact Fusion" by P. M. Echenique, J. R. Mousin, R. H. Ritchie *Physical Review Letters*, Vol. 64, No. 12, Mar. 19, 1990 pp. 1413–1416; "Clouds of Trapped Cooled Ions Condense Into Crystals", Physics Today, September 1988, pp. 17–20; "Cluster-Impact Fusion", R. J. Beuhler, J. Friedlander, and L. Friedman, Physical Review Letters, Vol. 63, No. 12, Sep. 18, 1989 pp. 1292–1295; "Phase-Diagram Considerations of Cluster Formation When Using Nozzle-Beam Sources", E. L. Knuth, W. Li, J. P. Toennies, copyright 1989, American Institute of Aeronautics and Astronauts, Inc., International Symposium on Rarefied Gas Dynamics, p. 239, edited by M. Summerfield; "Cluster Ion Formation in Free Jet Expansion Processes at Low Temperatures", R. J. Beuhler and L. Friedman, copyright Verlog Chemie (mbH, D-6940 Weinheim, 1984) International Symposium on Rarefied Gas Dynamics; "Influence of Surface Roughness on the Momentum Transfer by 350-KeV Hydrogen-Cluster Ions"; W. Keller, R. Klingelhofer, B. Krevet, H. O. Moser, and R. Ries, *Rev. Sci. Instrum* 55(4), April 1984 pp. 468–471; "New Type of Collective Acceleration," Charles W. Hartman, James H. Hammer, *Physical Review Letters*, Vol. 48, No. 14, Apr. 5, 1982 pp. 929–932; "Experimental Demonstration of Acceleration and Focusing of Magnetically Confined Plasma Rings", J. H. Haniver, Charles W. Hartman, Jr., L. Eddleman, *Physical Review Letters*, Vol. 61, No. 25, Dec. 19, 1988, pp. 2843–2846, Japanese Patent 60-200448, Hitachi Seisakusho, K. K., Sep. 10, 1985; Conference Paper on "Rarefied Gas Dynamics", H. Buchenau, R. Gotting, A. Scheidemann, J. P. Toennies (1986) 15th International Symposium on Rarefied Gas Dynamics, Vol. II, p. 197 (1986), edited by V. Boffi and L. Ceragnami; and "Dynamics of Atomic Collisions on Helium Clusters", Jurgen Gspann, R. Ries (Oct. 28, 1986) *Physics and Chemistry of Small Clusters* edited by P. Jenna, B. K. Rao and S. N. Khanna, Nato ASI Series 158, 1986, p. 199.

In considering the introduction of charged particles into fluids, the principle of field emission is now considered.

The principle of field emission is that for a curved surface with radius "a" of curvature "r" at a potential V, the electric field E may be defined as $V/r$ so that for a small enough radius, say $r=1$ μm, and a potential of 1 kV, the electric field is $10^7$ V/cm. With this large field outside an atom, an electron may readily tunnel through the potential barrier of the nucleus and become free. This technique has been used in transmission electron microscopes to generate an electron source of very high brightness. In these devices, the cathode is made of a tungsten wire with a 1 μm radius and then an extra fine tip with a radius of 100 nm or less is electrolytically etched on the wire. For a brief description of this technology, see e.g. L. Reiner: *Transmission Electron Microscope*, 2nd Edition, , Springer Valley (1989).

| field strength | $10^7$ V/cm |
|---|---|
| area | $10^{-12}$ m$^2$ |
| current density | 100 A/cm$^2$ |
| current | 1~10 μA |
| solid angle | 0.1 radian |

Until now, field emission techniques have been used to generate electrons. Now disclosed is the use of the field emission technique to charge liquids as well as gases, that is in fluids, to charge strongly coupled or coherent clusters, or alternatively a liquid jet.

SUMMARY OF THE INVENTION

In accordance with the present invention there is provided a method of charging a beam comprising passing a fluid from an area of first pressure to an area of second pressure, the second pressure being lower than the first pressure, and charging said fluid so that particles of the fluid are accelerated in the area of second pressure so as to form a charged beam, wherein the charging imparts sufficient charge to the fluid so as to achieve a charge density greater than $10^{16}$ charge per cm$^3$ within the fluid.

In another aspect, there is provided a method for forming charged liquid jet comprising:

passing a liquid into a nozzle defining a nozzle mouth, said nozzle maintaining the liquid at a first pressure;

introducing one of negatively or positively charged particles in the liquid by means of the respective one of field emission or field ionisation;

directing the charged liquid out of said nozzle mouth into a second area of lesser pressure than the first area such that a charged liquid jet is created.

In another aspect, there is also provided a method for forming strongly coupled or coherent charged clusters comprising:

passing a fluid comprised of liquid or gas, into a nozzle defining a nozzle mouth, said nozzle maintaining the liquid at a first pressure;

introducing one of negatively or positively charged particles in the liquid by means of the respective one of field emission or ionisation;

directing the charged liquid out of said nozzle mouth into a second area of lesser pressure than the first area such that of charged clusters is created.

The charged particles may be introduced by a process involving field emission from a through a tip made from, for example, tungsten wire, a latham compound (LAB$_6$), or other element with a low work function. Particularly of interest in this invention is the charging of a liquid as it is turned into clusters and doing so without destroying the strong coupling or coherency of that cluster.

It is preferable that these charges be introduced close to the nozzle mouth.

DESCRIPTION OF THE DRAWINGS

FIGS. 8a through 8d are diagrammatical views of a nozzle for charging a liquid jet.

DETAILED DESCRIPTION OF THE INVENTION

THEORETICAL BACKGROUND

Figure 1:
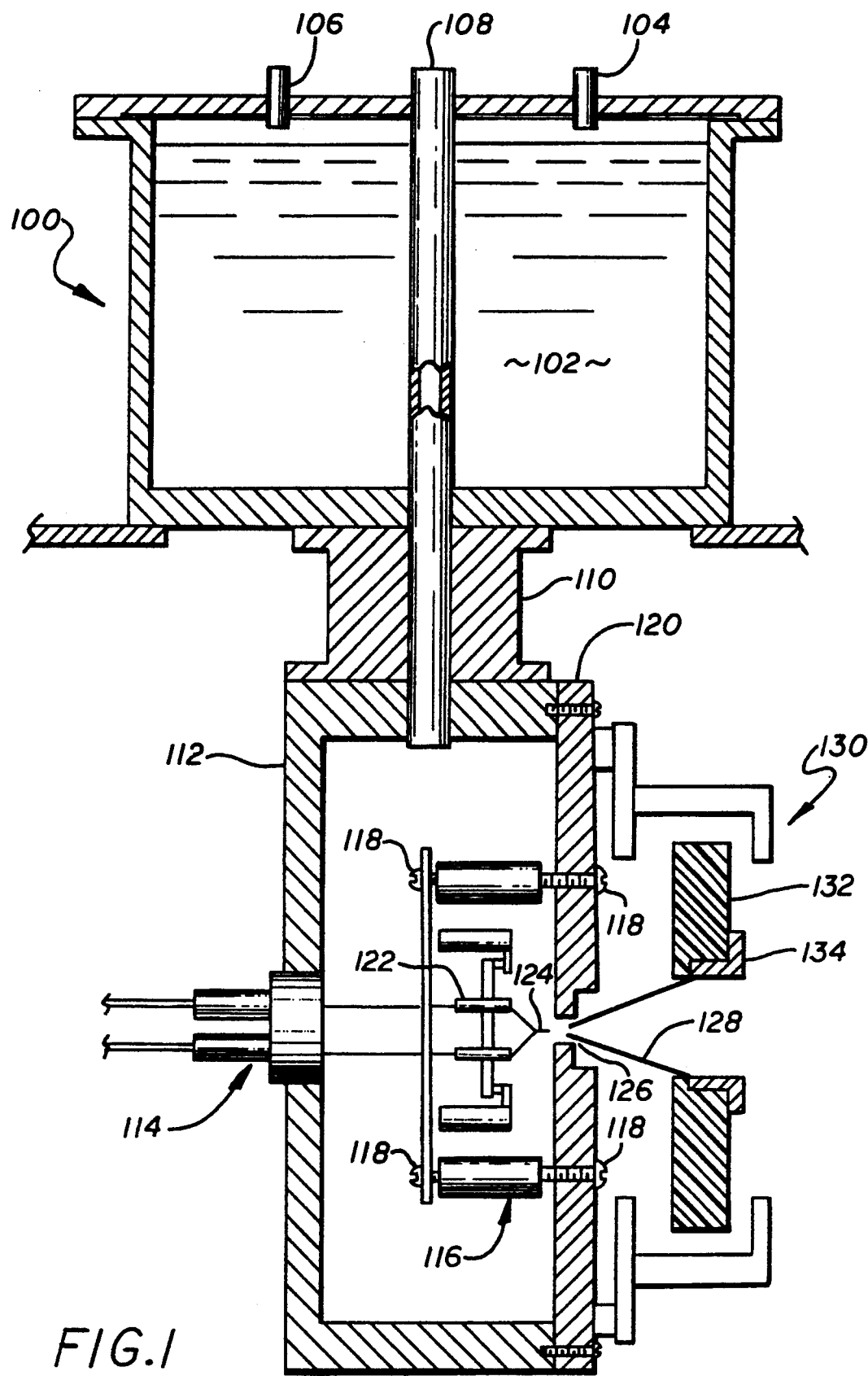
FIG. 1 is a sectional view of a cryostat and nozzle for creating a charged beam.

To assist the reader in better understanding this invention, a theoretical description of the technology involved the production of cluster beams and liquid jet beams is first presented.

1. Beam of Strongly Coupled or Coherent Clusters

There are two kinds of beams made up of coherent clusters which are charged. For neutral coherent clusters, there does not exist any interaction between any two clusters. However, if the clusters are charged, then the clusters interact via Coulomb forces. In such a beam, the coupling of the clusters can be separated into weakly coupled clusters and strongly coupled clusters by their coupling factor ($\Gamma$) defined as $$\Gamma = \frac{P.E.}{K.E.} \tag{1}$$

$$= \frac{(Ze)^2}{aT}$$

where $a$ = average distance between the clusters
$Z$ = charge of the clusters
$T$ = temperature of the cluster beam
$e$ = electron charge The charged cluster beam then can behave as $\Gamma << 1$ gas-like
$\Gamma \sim 1$ liquid-like
$\Gamma >> 1$ superfluid or solid In Table I, the coupling for clusters with some charges, Z, are listed

TABLE I

| | | | The Coupling of Charged Cluster Beam | | | |
|---|---|---|---|---|---|---|
| Temperature | Density | Distance | | Coupling ($\Gamma$) | | |
| T = 1.2° K | n (1/cm) | a | Z = 1 | Z = 2 | Z = 3 | Z = 4 |
| | $10^{18}$ | 6 nm | 2335 | 9420 | 21195 | 2.355 × 10 |
| | $10^{15}$ | 60 nm | 233.5 | 942 | 2119.5 | 23550 |
| | $10^{12}$ | 0.6 μm | 23.55 | 94.2 | 211.95 | 2355 |
| | $10^{9}$ | 0.6 μm | 2.355 | 9.42 | 21.195 | 235.5 |
| | $10^{8}$ | 13.35 μm | 1.093 | 4.36 | 9.84 | 109.3 |
| | $10^{7}$ | 28.78 μm | 0.507 | 2.03 | 4.56 | 50.7 |
| | $10^{6}$ | 62 μm | 0.236 | 0.94 | 2.12 | 23.55 |
| T = 0.4° K | $10^{18}$ | | 7,065 | 28,260 | 63,585 | 706,500 |
| | $10^{15}$ | | 706 | 2,826 | 6,358.5 | 70,650 |
| | $10^{12}$ | | 70.65 | 282.6 | 635.85 | 7065.0 |
| | $10^{9}$ | | 7.065 | 28.26 | 63.59 | 706.5 |
| | $10^{8}$ | | 3.28 | 13.08 | 29.52 | 328 |
| | $10^{7}$ | | 1.52 | 6.08 | 13.68 | 152 |
| | $10^{6}$ | | 0.707 | 2.82 | 6.36 | 70.7 |

The average distance "a" between clusters is defined by $$\frac{4}{3} \pi a^3 n = 1$$

From Table 1, it is seen that for singly charged clusters with Z=1, at 0.4 degrees kelvin, density n~$10^6$ to $10^9$, the coupling factor ($\Gamma$) ranges from 1 to 7 so that the charged cluster beam is liquid-like. To have a crystalline cluster beam, it is convenient to have multiple charged clusters, say with Z≈10 for each cluster.

There are three binding energies that are important in considering the stability of strongly coupled cluster beams:

(1) the binding energy of electrons or ions to the atom (or molecule), (2) the binding energy of one atom (molecule) with another atom (molecule) in the cluster, and (3) the potential energy among the charged clusters. If these three energies are stronger than the perturbing source, such as from the external accelerating electric potential, or from the Coulomb repulsion among charges inside the cluster beam, then the cluster beam will preserve its character. Otherwise, the cluster beam will undergo some qualitative changes. Let us discuss these binding energies and Coulomb repulsion forces one at a time.

Although the above discussion is largely concerned with clusters, similar considerations apply conncerning charges in neutral liquid, and in particular the deformation of the above described is applicable in such case.

2. Binding Energies (i) The binding energy (B) of electrons and ions with atoms (or molecules). The binding energy of electrons to H or $H_2$ to form $H^-$ and $H_2^-$ is 0.75 eV, which is about 20 times mailer than the binding energy of electrons in a neutral hydrogen molecule.

$$B_{e-}(H^-) = 0.7542 \; eV \tag{3}$$

(ii) The binding energy of an atom (molecule) in a cluster.

Here, the binding energy can be estimated from the heat of vaporization. The heat of vaporization for liquid oxygen is 6812.3 J/mole. By molecule, the binding energy (B) is $$B_{O2} = \frac{6812.3J}{6 \times 10^{23}} = 0.071 eV \quad (4)$$

where $O_2$ is oxygen and $6 \times 10^{23}$ is Avogadro's number. This binding energy is ten times smaller than the binding energy of electrons to the hydrogen atom. For helium, the heat of vaporization is about 14 to 22 cal/mole depending on pressure, and the binding energy of the helium atom in liquid is in the range of $$B_{He} = (6.1 \text{ to } 9.6) \times 10^{-4} eV$$

The potential energy between two neighbouring charged clusters inside a cluster beam is $$eV_c = Z^2 \frac{e^2}{a} = 1.46 \times 10^{-3} eV \text{ for } Z = 1, a = 1 \mu m \quad (5)$$

where again V is the potential, Z is the cluster charge, and a is the average distance between clusters. Hence the potential energy between two neighbouring charged clusters is smaller than the binding energy of the cluster (except in the case of helium clusters). We then have the following inequality.

$$B_e > B_{O2} > B_V \quad (6)$$

The condition for accelerating a crystalline solid strongly coupled cluster without destroying the crystalline structure is $$\frac{eV}{l} < \frac{eV_c}{a} \quad (7)$$

where
$eV_c$ = the potential difference between two electrodes
$l$ = distance between two electrodes
$eV < eV_c$
so for $eV_c = 1.46 \times 10^{-3}$ volt, $a = 1 \mu m$, $l = 1$ cm, $eV < 14.6$
volt for $Z = 1$ $eV < 1.46$ for $Z = 10$ There are two important features for accelerating a crystalline charged cluster beam that separate it from those of an ordinary ion beam.

(1) The total beam intensity is greatly enhanced. The size of a cluster in a cluster beam may range from A=100 to A=5,000 atoms or more in any single cluster. The charges in each cluster may vary from Z=1 to Z=10 or more. If we select clusters with a fixed number of atoms, say 200 atoms, and fixed charge, say Z=1, we only have a very small portion of all clusters in a cluster beam. However, if the clusters are not strongly coupled, we can only accelerate clusters with the same A and Z, with a given potential. Clusters with different A's and Z's will travel at different speeds. The resulting cluster beam from acceleration through an applied electric field is a very weak beam for a weakly coupled cluster beam.

(2) The energy spread ΔE of the accelerated crystalline cluster beam is very small. It is only equal to the temperature T of the cluster.

$$\Delta E \sim T$$

Since T~$10^{-4}$ eV for a helium cluster which was cooled to this temperature during expansion, the energy spread as a percentage of the final energy E of the cluster beam is extraordinarily small, $$\frac{\Delta E}{E} = \frac{T}{E} = 10^{-7} \text{ for } E = 1 keV$$

A very high quality beam is produced. It is clear that production of a charged crystalline solid strongly coupled cluster is advantageous. The inventor's earlier noted applications, all incorporated herein by reference, disclose the means for forming coherent clusters. These are clusters that are coherent within themselves and amongst themselves. As discussed above, adding charge to these clusters is tremendously advantageous and now disclosed is the detailed method of accomplishing this task. This method does not destroy the coherency of the clusters nor does it unduly heat the fluid from which the clusters are made. This is not true when electric arcing, (such as in the above-noted Friedman patent), microwaves or heating gas is used.

3. Method of Generating Charged Particles to Produce Strongly Coupled Clusters

The inventor teaches in the above-noted patent applications, incorporated herein by reference, the method of making coherent clusters. These are created by passing bosons with mass (such as helium) through a nozzle of a higher pressure to an area of lower pressure (such as a vacuum). In this method, it is advantageous to have a high density of borons and to keep the temperatures at room temperature or below. The forming of coherent helium and helium clusters is well-known in the art. The method of producing clusters is modified in this invention by charging the bosons with mass just before they exit the nozzle mouth into the area of lower pressure. Presenting the charge at this point and presenting it in a slow, low energy manner, prevents the heating of the bosons with mass, thus, preventing the undue heating of the fluid. It also prevents or minimizes the destruction of any strongly coupled or coherent particles or clusters. Also clearly taught herein is forming clusters from a liquid as well as a gas.

4. Liquid Jet Beam and Molecular Binding Forces within a Liquid

In a neutral jet of liquid there exist molecular binding forces between the molecules forming the liquid. These binding forces provide a cohesion throughout the liquid which provides the ensemble of molecules with liquid characteristics.

If the kinetic energy of the molecules is increased the binding forces will be overcome and the liquid will dissociate into individual gas particles. This can be seen generally from the coupling factor (Γ) as defined above If the molecules or particles forming the liquid are charged and introduced into the liquid jet, Coulomb repulsion between these particles/molecules, together with the diameter of the jet become relevant factors in determining whether the molecular binding forces within the liquid jet will be overcome and the individual molecules of the liquid dissociate to form clusters or a gas phase.

If the charge density $n_-$ is small, the beam diameter not big, the electric field will not be strong enough to overcome the molecular binding among the molecules in the liquid. The liquid jet will remain a liquid jet. If the charge density $n_-$ increases the electric field from Coulomb repulsion among the negative charges in the beam will overcome the adhesive forces among the molecules. The liquid jet will break into charged clusters.

The electric field around a cylinder is given by $$\int E \cdot ds = Q/\epsilon_o \tag{3a}$$

$$E = \left(\frac{e}{4\pi\epsilon_o}\right) \times 2\pi r n \tag{3b}$$

where r is the radius of cylinder and $n_-$ is the charge density inside the cylinder.

The repulsive force $F_r$ on a charge e by this electric field is $$F_r = \left(\frac{\alpha}{a^2}\right) \frac{3}{2R} \left(\frac{r}{a}\right) \tag{3c}$$

$$\alpha = \frac{e^2}{4\pi\epsilon_o} = \frac{1}{137}$$

where R is the ratio between neutral and charge density $$R = \frac{n_o}{n_-}$$

and a is the radius of the volume occupied by one molecule $$\frac{4\pi}{3} a^2 n_o = 1 \tag{4}$$

This repulsive force is being counter-balanced by the attractive force between molecules:

$$F_a = \frac{\partial \epsilon_M}{\partial r} \sim \frac{\epsilon_M}{a} \tag{5}$$

For the liquid jet not to be broken up by Coulomb repulsion, we require $$F_r \leq F_a \tag{6}$$

or $$\left(\frac{r}{a}\right) \leq \frac{2R}{3} \frac{\epsilon_B}{\epsilon_M} \tag{7}$$

where $$\epsilon_B = \frac{\alpha}{a}$$

$$\frac{\epsilon_b}{\epsilon_M} \sim 10^{-2} \text{ for } LN_2 \tag{8}$$

The numerical factor ($\frac{2}{3}$) is reduced to 1, if we are not considering a cylindrical liquid jet beam with beam radius r, but a spherical liquid drop with radius r. We tabulate the typical values for liquid nitrogen in the following table (1). The equation (7) is modified if we regard it as necessary to break all the molecular binding in the crosssection to become $$\left(\frac{r}{a}\right) \leq \frac{2R}{3} \left(\frac{\epsilon_B}{\epsilon_M}\right) N_c^{\frac{1}{3}} \tag{9a}$$

where $N_c^{\frac{1}{3}}$ is the number of molecules of which the bonding must be broken.

TABLE 1

| R | r/a | $N_c$ | $Z_c$ | $n_-$ | r |
|---|---|---|---|---|---|
| $10^9$ | $10^7$ | $10^{21}$ | $10^{12}$ | $2.2 \times 10^{13}$ | 2 mm |
| $10^7$ | $10^5$ | $10^{15}$ | $10^8$ | $2.2 \times 10^{15}$ | 20 μm |
| $10^5$ | $10^3$ | $10^9$ | $10^4$ | $2.2 \times 10^{17}$ | 0.2 μm |
| $10^4$ | $10^2$ | $10^6$ | $10^2$ | $2.2 \times 10^{18}$ | 20 nm |
| $10^3$ | 10 | $10^3$ | 1 | $2.2 \times 10^{19}$ | 2 nm |

$N_c$ = number of molecules in a spherical charged cluster
$Z_c$ = number of negative charges in the cluster calculated from eq. (7) and not (9a).

5. Formation of a Liquid Jet

To form a liquid jet it is necessary to have a suitable nozzle or hole through which liquid must pass without forming spray or turbulence. Quantitatively the most important scale variable that determines the formation of a liquid jet is its Reynold number defined by $$R_o = \frac{uD}{v}$$

where u is the velocity of the liquid jet, D the diameter of the nozzle, or hole, and v the kinetic viscosity of the liquid. The velocity is related to the pressure by $$u = \sqrt{\frac{2p_o}{\rho}}$$

$p_o$ = pressure of the liquid at the nozzle
$\rho$ = density of the liquid

If the Reynolds number is smaller than a minimum number, $R_o < R_{a\ min}$, liquid just seeps through to form droplets. Also if the Reynolds number is bigger than some maximum number $R_o > R_{o\ max}$, turbulence will develop and magnify itself so that a stable jet can not be formed. Probably spray-type formation occurs. In the range $R_{o\ min} < R_{o\ max}$, we have a liquid jet.

It has been found by M. Faubel, S. Schlemma and J. P. Toennies, Z-Phys. D-Atoms, Molecules and Clusters 10, 269–277 (1988) that a water jet passing through a nozzle of diameter D=5 μm with thickness 20 μm, will form a liquid jet in the range $$250 < R_o < 1200$$

The upper limit is only an experimental finding special to the set-up of this particular experiment. If the Reynolds number is very large, laminar flow will be observed within the nozzle, in particular within a long pipe with a Reynolds number 50,000. For a detailed discussion, see L. D. Landau and E. M. Lifshitz. Fluid Mechanics, Pergamon Press 1959, P. 111-114. Even the discussion there refers to a pipe with infinite length. In the present invention, the length of the nozzle may be of the same order as the diameter.

Two cases are now discussed, one for liquid nitrogen, and another one for liquid helium.

(1) Liquid Nitrogen:

| | | |
|---|---|---|
| $\nu$ = | 0.0272 cm$^2$/sec | (liquid nitrogen) |
| = | 0.010 | (water) |
| = | 0.022 | (alcohol) |

The Reynolds numbers for different pressures are tabulated in Table (2) for a nozzle diameter D=50 μm.

TABLE 2

| | Reynolds number for liquid nitrogen jet* | | |
|---|---|---|---|
| P (Pa) | u (cm/sec) | $R_o$ | n (Y cm$^3$) |
| $1.392 \times 10^4$ | $5.86 \times 10^2$ | 107.8 | $1.74 \times 10^{13}$ |
| $1.39 \times 10^5$ | $1.852 \times 10^3$ | 340.5 | $1.74 \times 10^{14}$ |
| $1.39 \times 10^6$ | $5.86 \times 10^3$ | 1078 | $1.74 \times 10^{15}$ |
| $1.39 \times 10^7$ | $1.852 \times 10^4$ | 3405 | $1.74 \times 10^{16}$ |
| $1.39 \times 10^8$ | $5.86 \times 10^4$ | 10,780 | $1.74 \times 10^{17}$ |

The pressure can come from two sources:

$$p = p_o + p_-$$

where $p_o$ is the pressure applied to the liquid nitrogen externally, say, through a nitrogen gas tank, and $p_-$ is the pressure due to the charges being accelerated from the tip to the nozzle by externally applied electric field given by $$\frac{p_-}{n_o} = \frac{eV}{R}$$

$R = n_-/n_o$
$n_o = 1.74 \times 10^{22}/\text{cm}^3$ for liquid nitrogen
For eV=1 eV, we have $p = 2.78 \times 10^9$ Pa. Here if we take V=5 kV, and for various charge density $n_-$, we calculate $n_-$ from $p_-$ by setting $p_o = 0$, $p = p_-$. The values of charged densities obtained thus are listed at the last column of Table (2).

(2) Liquid Helium

| T(°k): | 1.0 | 1.2 | 1.4 | 1.6 | 1.8 | 2.0 | 2.1 |
|---|---|---|---|---|---|---|---|
| $\nu(\times 10^6)$ | 241.9 | 121.3 | 98.6 | 87.53 | 87.24 | 94.64 | 112.46 |

For tabulation purposes, we choose to express $$v = 10^{-4} \nu$$

where v is of the order 1 in the range of T=1.0 to 2.1 °K. For a nozzle diameter D=5 μm, we calculate the Reynolds number $R_o$, and it is tabulated in Table (3).

TABLE 3

| | Reynolds number for liquid helium jet | | |
|---|---|---|---|
| p (Pa) | u(cm/sec) | $R_o$ | n (1/cm$^3$) |
| $0.822 \times 10^2$ | $1.065 \times 10^2$ | 532 | — |
| $10^3$ | $3.71 \times 10^3$ | 1855 | — |
| $10^4$ | $1.17 \times 10^3$ | 5872 | — |
| $1.76 \times 10^4$ | $1.56 \times 10^3$ | 7790 | $2.2 \times 10^{13}$ |
| $1.76 \times 10^5$ | $4.93 \times 10^3$ | 24,600 | $2.2 \times 10^{14}$ |
| $1.76 \times 10^7$ | $4.93 \times 10^4$ | 246,000 | $2.2 \times 10^6$ |

6. Method of Generating Charged Particles to Produce A Charged Liquid Jet

Similarly to the method of generating charged particles to produce strongly coupled clusters, the method of producing a charged liquid jet is facilitated by charging molecules or atoms which form the liquid just before they exit the nozzle mouth into the area of lower pressure. Presenting the charge at this point and presenting it in a slow, low energy manner, prevents the heating of the molecules, thus, preventing the undue heating of the liquid. It also prevents or minimises the destruction of molecular binding forces existing between the molecules forming the liquid.

The apparatus used to facilitate the charging of the fluid to form either the strongly coupled cluster beam or the liquid jet beam is shown in FIG. 1. Cryostat (100) defines within itself a reservoir (102) in which liquid nitrogen is held. Instead of liquid nitrogen, other elements for cryogenic cooling may be used. Some of these are liquid helium, liquid hydrogen, etc. At the top of cryostat (100) is inlet pipe (104) through which the liquid nitrogen is introduced into reservoir (102), and outlet/pumping connection (106) which communicates with reservoir (102). Also shown is tube (108) which passes through cryostat (100) and reservoir (102). It is through tube (108) that the fluid which is to be charged in the nozzle is fed. This fluid is usually in the form of a gas and preferably a purified gas, when introduced near the top of cryostat (100) into tube (108). However, as the gas passes down tube (108) and thus through reservoir (102), it is cooled by the liquid nitrogen surrounding tube (108) and becomes a liquid. The liquid contemplated herein is comprised of bosons having mass such as water, hydrogen, nitrogen, deuterium, helium, etc. Cryostat (100) is connected through attachment means (110) to nozzle cell (112) which forms a portion of nozzle used to spray the liquid into the lower pressure area. Tube (108) passes through cryostat (100), attachment means (110), and into the cavity defined by nozzle cell (112). Here the gas turned liquid which is passed through tube (108), empties. The back of nozzle cell (112) attaches to a plug (114) whose electrical wires are diagrammatically depicted as "a" and "b". At one end outside of nozzle cell (112), wires "a" and "b" are attached to a voltage device which is not shown. At another end, wires (a, b) pass through plug (114) and are electrically connected to tungsten wire (122) held in adjustable mounting (116). Screws (118) or other adjustment means are shown in adjustable mounting (116) and attach adjustable mounting (lift) to nozzle face (120). Adjustment of screws (118) enables the displacement of adjustable mounting (116), tungsten wire (122) and its tip (124) with respect to the back of the nozzle cell (112) and nozzle face (120). As can be seen in FIG. 1, nozzle face (120) connects to nozzle cell (112) opposite of the back of nozzle cell (112). Some details concerning tungsten wire (122) and its tip (124) are discussed herein in the Background of Invention section and the reader may wish to review this section. Tip (124) lies preferably behind and centrally of nozzle mouth (126) defined in nozzle face (120). The distance between tip (124) and nozzle mouth (126), and the size of the tip (124) are significant in terms of the results obtained and are discussed further herein.

The diameter of nozzle mouth (126) should be in the range of approximately 5 microns to 1 millimeter. Located near nozzle mouth (126) and emanating therefrom are skimmers (128) attached to variable position mount (130). Variable position mount (130) is adjustably connected to nozzle face (120) to enable movement of skimmers (128) toward or away from nozzle mouth (126). While skimmers (128) are indirectly connected to nozzle face (120) they are insulated therefrom so that the voltage between skimmers (128) and nozzle mouth (126)

can be varied. The manner of achieving such insulation is evident to one skilled in the art. In FIG. 1, insulated elements (132) are shown as part of variable position mount (130), and conductive elements (134), also part of variable position mount (130), connect to voltage means (not shown) for charging skimmers (128). While electrical connections to skimmers (128) and nozzle mouth (126) are not shown, the manner of attending to such is known in the art and is contemplated herein to achieve the voltage variation discussed. Similarly, while tip (124) is indirectly connected to nozzle face (120) by adjustable mount (116), it is insulated therefrom so that again a voltage difference between tip (124) and nozzle mouth (126) is possible.

It is to be understood that the pressure in nozzle cell (112) is at one level while the pressure around skimmers (126) is at another level. In the present example, skimmers (126) are located in a vacuum chamber while the pressure inside nozzle cell (112) is at a higher level.

With the apparatus of FIG. 1, the fluid introduced through tube (108) into nozzle cell (112) will exit nozzle mouth (124) into an area of lower pressure such as a vacuum chamber. Prior to exiting, however, the gas turned liquid will be charged by a very low voltage emitted from tip (124) of tungsten wire (122). Tip (124) is then at one voltage level, nozzle mouth (126) is at another voltage level, and skimmers (128) are at a voltage level different from that of nozzle mouth (126). Review of FIG. 2, is of use in this instance.

Figure 2:
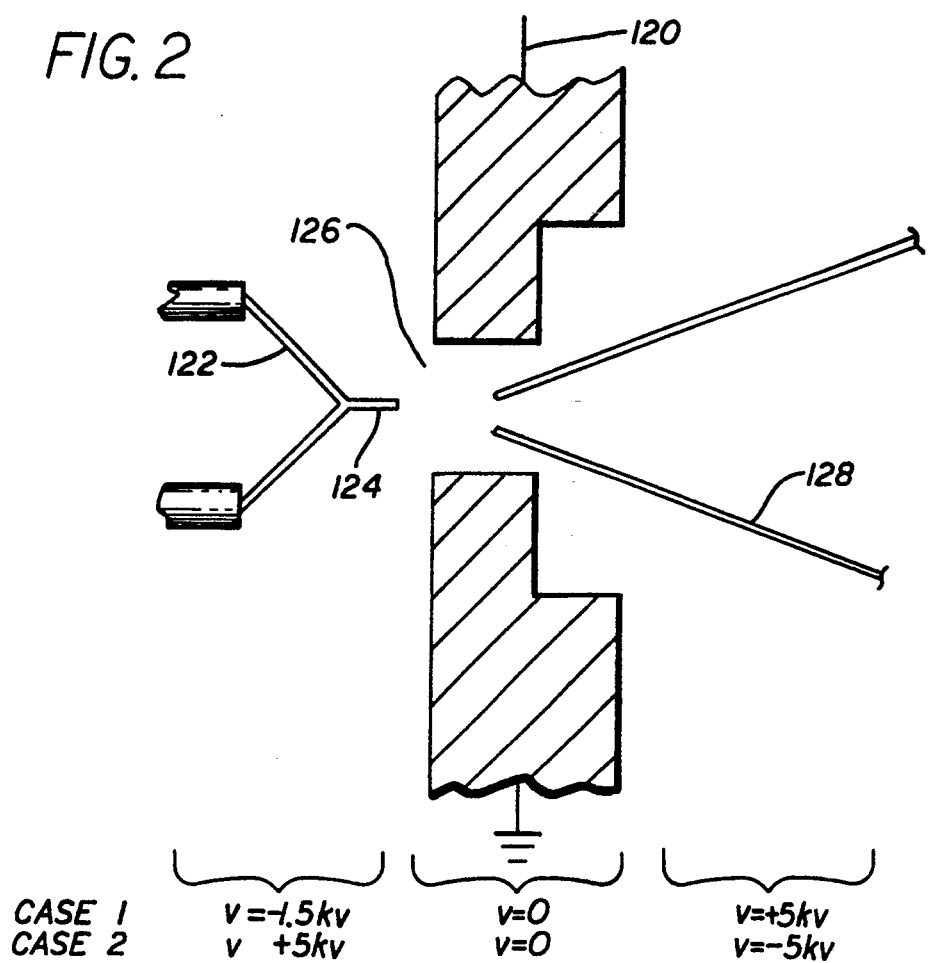
FIG. 2 is a diagrammatic depiction of the tungsten tip, nozzle mount, and skimmers of FIG. 1.

In FIG. 2, tip (124) emits a charge of negative 1.5 kilovolts. Nozzle mouth (126) is at ground and skimmers (128) are at positive 5 kilovolts. Alternatively, tip (124) could be at positive 5 kilovolts, nozzle mouth (126), at ground, and skimmers (128) at negative 5 kilovolts.

Once the liquid near tip (124) in nozzle cell (112) is charged by electrons slowly emitted from tip (124), the charged liquid is attracted and accelerated toward and through the positively biased nozzle mouth (126). Some of the electrons may also combine with the molecules in the liquid to form negative ions such as $N_2^-$. The liquid with electrons passes through nozzle mouth (126) and enters the vacuum chamber where skimmers (128) are located. If the voltage in tip (124) is reversed so that it is positive, say 5 kilovolts voltage with respect to nozzle mouth (126), then the strong positive field near the surface of tip (124), will ionize the atoms or molecules in the liquid. Electrons will flow into the tungsten wire (122) and positive ions such as ions $H^+$, $N^+$, $d^+$, or $He^+$, (if the liquid is composed of hydrogen, nitrogen, deuterium, or helium), will travel toward the relatively negatively biased nozzle mouth (126). The liquid containing these positively charged ions then flows into the vacuum chamber.

Tip (124) is preferably placed within nozzle cell (112) and within the liquid to be formed into clusters. It is also preferably placed near nozzle mouth (126).

If field emission method is used to inject electrons or ions in liquid, due to small mobility of charged particles in liquid, they tend to travel slowly. In fact, the velocity (u) is $$u = \mu E \quad (9)$$

where $\mu$ is the mobility and E the electric field at that point. For a spherical symmetric configuration where tip (124) is at the center with applied potential V, the electric field due to the applied external potential without counting the contribution from charges in the liquid drops off as $1/r^2$ where r is the distance from the center. So, if the charged ions in the liquid are under the influence of an external electric field alone, they will travel at a slower speed as they move further from tip (124). This is quite different from the case in a vacuum. However, since charges are continuously being emitted from tip (124), Coulomb repulsion forces will push the charged ions causing them to move faster away from tip. The three equations that govern the behaviour of charged particles in liquid are the continuity equation, the Poisson equation, and the Lorentz force equation: where $$\nabla \cdot (nu) = 0 \quad (10)$$

$$\nabla^2 \phi = 4\pi e n \quad (11)$$

$$e(-\nabla \phi) = \mu u \quad (12)$$

where
n = charge density
$\phi$ = electric potential
$\nabla$ = gradient
u = velocity
$\mu$ = mobility
e = electron charge Solving these in the spherical symmetric case leaves only the radial velocity, or $$u_\theta = u_g = 0 \quad (13)$$

The continuity equation becomes $$\frac{1}{r^2} \frac{\partial}{\partial r} (r^2 n u_r) = 0 \quad (14)$$

The Poisson equation reduces to $$\frac{\partial}{\partial r}\left(r^2 \frac{\partial \phi}{\partial r}\right) = 4\pi e n r^2 \quad (15)$$

The Lorentz equation is $$u_r = \mu \nabla_r \phi = \mu \frac{\partial \phi}{\partial r} \quad (16)$$

Putting (16) into (14) results in $$\frac{\partial}{\partial r}\left(r^2 n \mu \frac{\partial \phi}{\partial r}\right) = 0 \quad (17)$$

or $$\frac{\partial \phi}{\partial r} = \frac{c_1}{r^2 n \mu} \quad (18)$$

where $c_1$ is a constant.

Together with (15), one can solve for the charge density $$n(r) = n_o \left(1 + \frac{8\pi e \mu n_o (r^3 - r_o^3)}{3 c_1}\right)^{\frac{1}{2}} \quad (19)$$

where $n_o$ is the charge density at the surface of tip $r=r_o$. At $r=r_o$, the electric field is $E_o$; from (18), one gets $$n_o = \frac{-c_1}{\gamma_o^2 \mu E_o} \tag{20}$$

and at the outer surface $r=R$, the electric field is $E(R)$; then $$n(R) = \frac{-c}{R^2 \mu E(R)} \tag{21}$$

which form (19) is also equal to $$n(R) = n_o \left(1 + \frac{8e(n_o^2)R}{3c_1}\right) \tag{22}$$

Equating (21) and (22), one can solve for $c_1$.

A numerical method to solve these equations may be used. With realistic values of the radius of tip (124) being 100 nm, the distance between tip (124) and nozzle mouth (126) being 1 mm, and the voltage between tip (124) and nozzle mouth (126) being 2 kV, the current density is found to be for the negatively charged case $3 \times 10^5$ amp/cm². The electron density at the center of nozzle mouth (126) is $4 \times 10^{15}$/cm³, and decreases to $10^{14}$/cm³ near the edge of nozzle mouth (126). FIGS. 3a through 3k illustrate this. In these graphs, as in this discussion, we have a = tip size
b = the distance between tip and nozzle mouth
mu = mobility
$E_f$ = fermion energy, a characteristic of the tungsten
W = work function, a characteristic of the tungsten
$J_o$ = electron current density
$E_o$ = electric field
$n_o$ = charge density
r(m) = distance from tip to area measured (electric field, current density, potential, etc.)

Figure 3A:
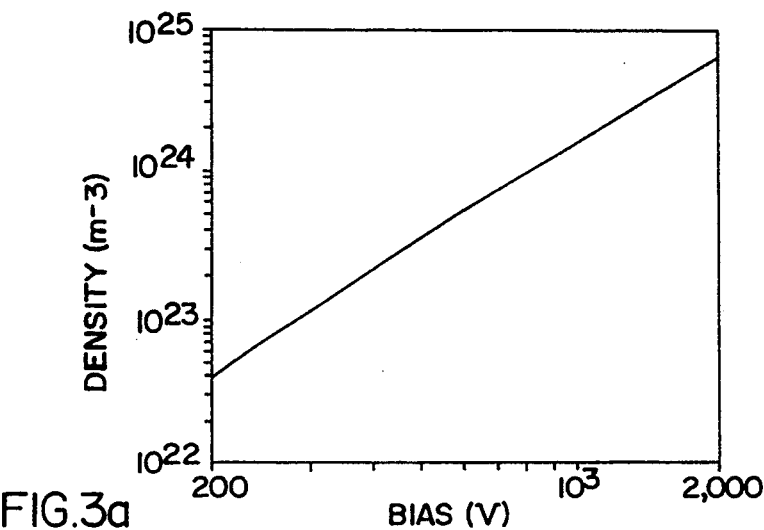
FIGS. 3a through 3k are graphs of a computer simulation showing the field emission effects in a device such as shown in FIG. 1.

FIG. 3a shows a charge density (1/m³) at tip (124) as a function of the bias voltage (volts) between tip (124) and nozzle mouth (126). The maximum density can be as high as $(5 \times 10^{24})$/m³.

Figure 3B:
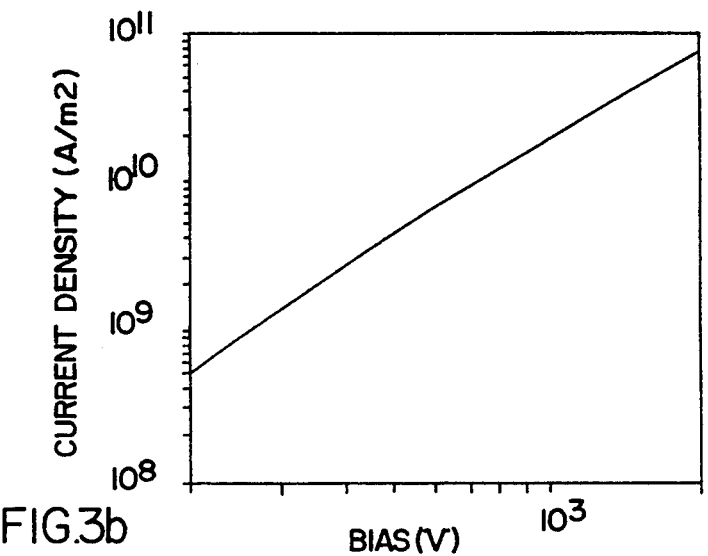

In FIG. 3b, the current density $J_o$ at tip (124) as a function of the bias voltage between tip (124) and nozzle mouth (126) is depicted. It is in the range of about $10^9$ to approximately $10^{11}$ amps/m².

Figure 3C:
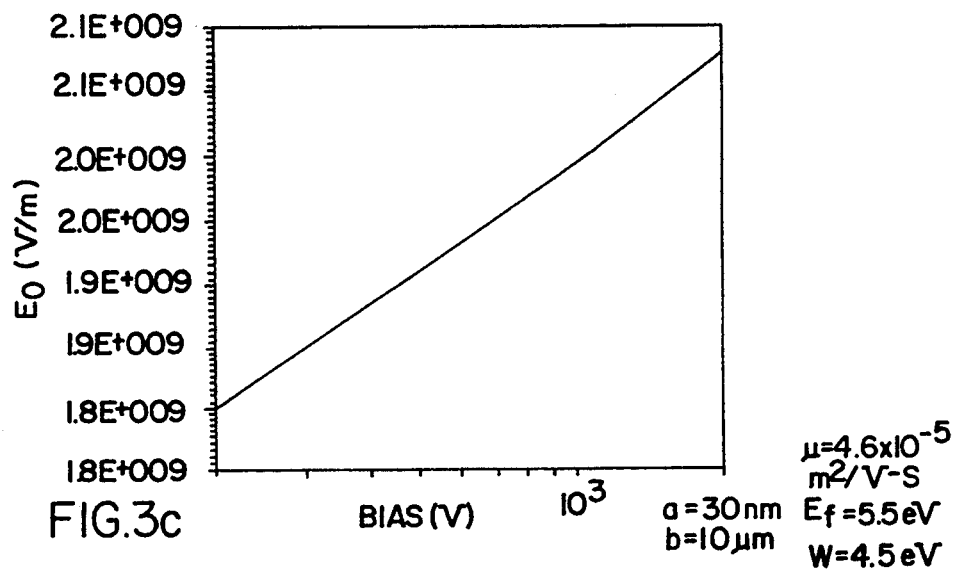
Figure 3D:
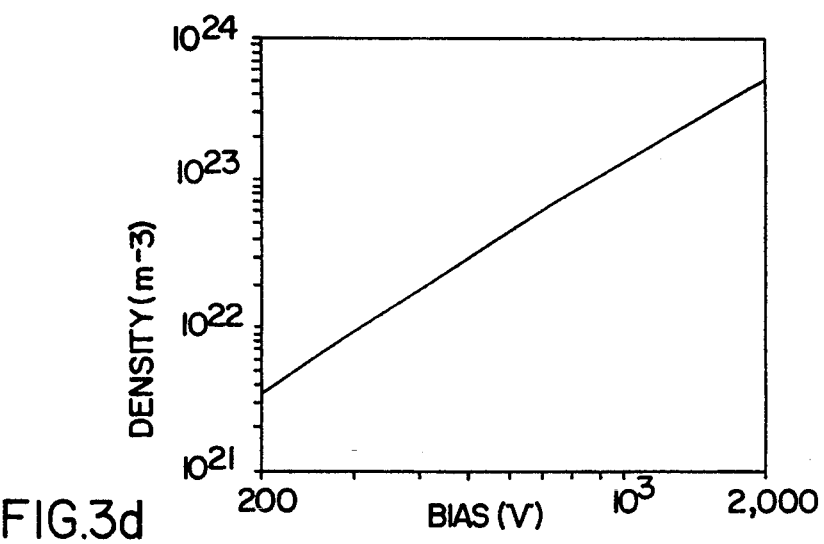
Figure 3E:
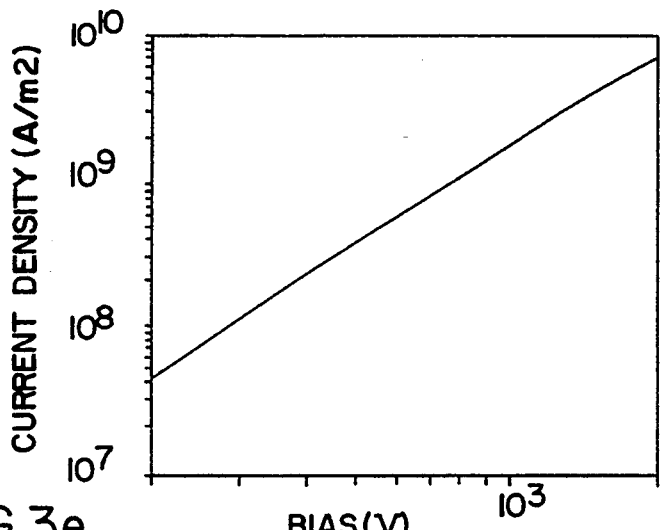
Figure 3F:
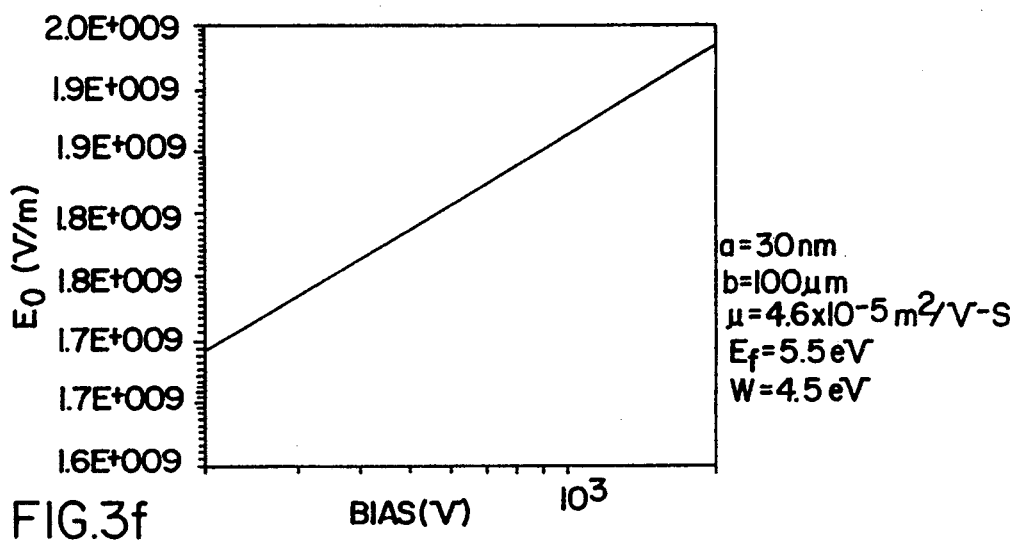

In FIG. 3c, the electric field at the surface of tip (124) as a function of the bias voltage is illustrated. It is basically $2 \times 10^9$ volts/m and is not sensitive to the bias voltage.

One can change the distance between tip (124) and nozzle mouth (126) to 100 micro meters and calculate the charge density, the current density, and the electric field as a function of the bias voltage. This has been done by the inventor and the results are found in FIGS. 3d through 3f.

Figure 3G:
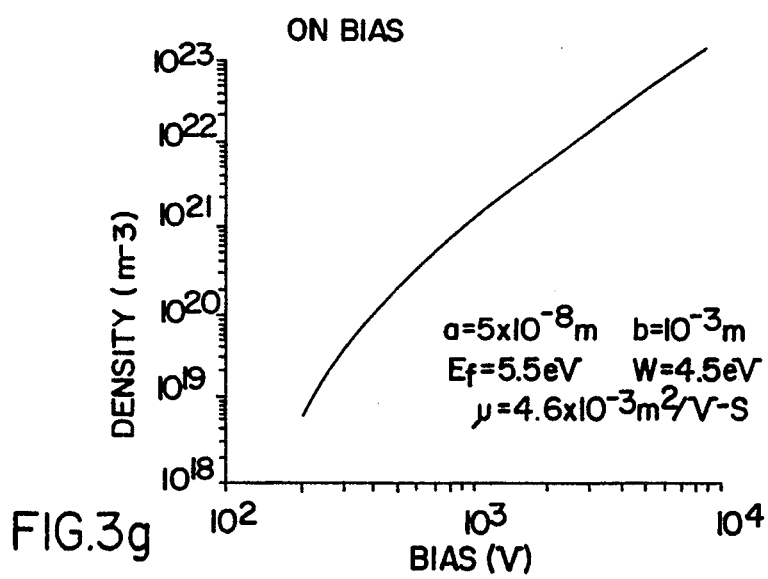
Figure 3H:
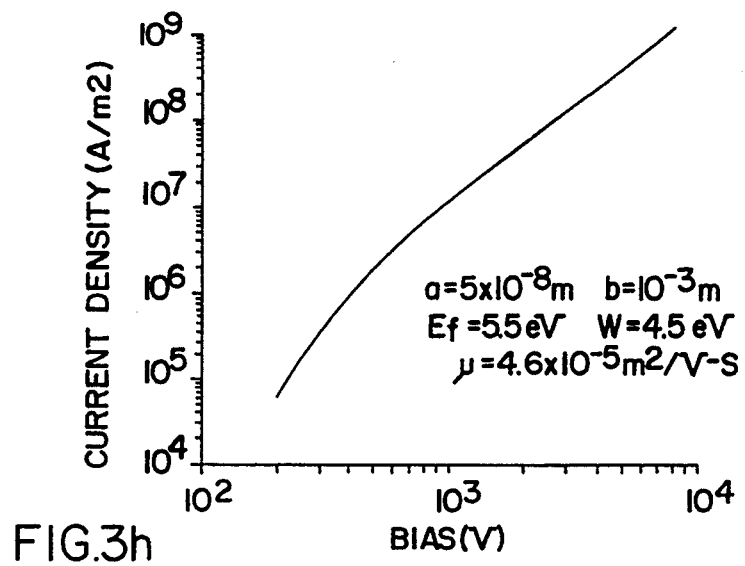
Figure 3I:
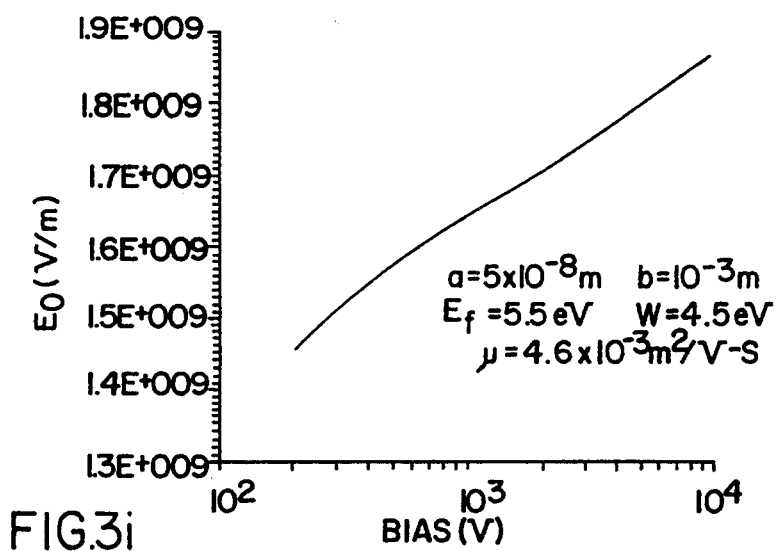
Figure 3J:
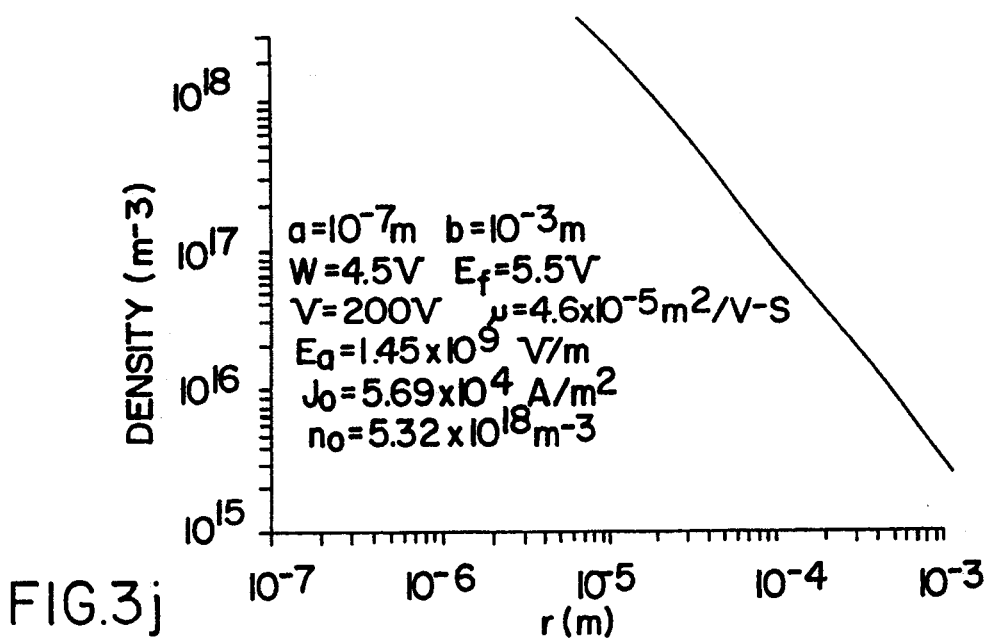
Figure 3K:
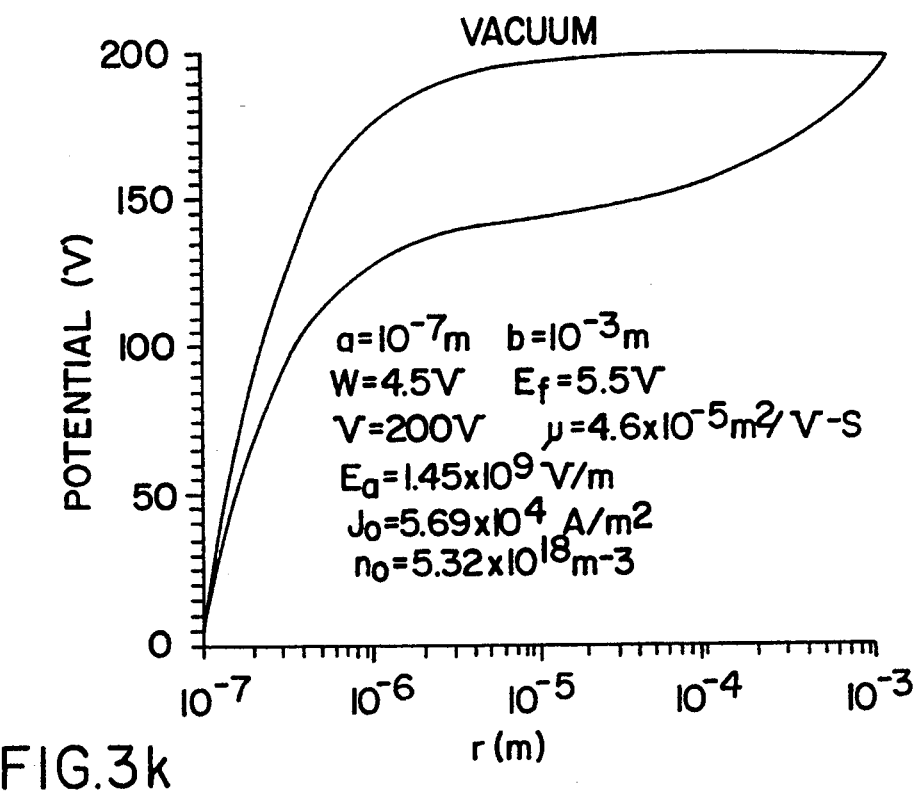

One can also change tip size (a) as well as alter the distance (b) between tip (124) and nozzle mouth (126) and see varied results. This again has been done by the inventor and is depicted in FIGS. 3g through 3i. These figures illustrate, charge density, current density, and electric field at the surface of the tip (124) with the tip being 0.5 micron and the distance between the tip and nozzle mouth being 1 milli meter. In FIGS. 3j and 3k the tip size is increased to 100 nano meters while the distance between the tip and nozzle mouth is kept at 1 milli meter. The charge density and potential are shown as a function of the distance r from the surface of tip (124).

As the beam is formed outside nozzle face (120) in the vacuum region, it is negatively charged by the excess electrons in it.

In order to enhance the current emitted, it may be advantageous to heat up the tungsten wire (122) connected to tip (124) by passing electric current through it. This generally vaporizes the liquid surrounding it to create a thin film of vapour around it. The vapour, however, serves as insulation to prevent the transmission of too much heat to the liquid. The power is of the order of 0.1 watts or less.

As an alternative to heating up the tungsten wire 122 in order to increase the total current generated, many such tips (124) may be utilized. In the limit of an infinite number of tips arranged in two dimensions, a substantially line-like structure such as the edge off of a wedge-shaped structure will be formed. An edge may therefore replace a single tip or plurality of tips to provide a large current with a high current density, as is shown below.

The electric field at a tip, $E_v$ without space charge effect can be estimated from a sphere of radius $r_t$. This is $$E_t = \frac{Q}{4\pi\epsilon_o r_t^2} = \frac{V}{r_t}$$

The electric field at an edge $E_w$ can be estimated from that of a long, straight wire with radius $r_t$. Applying Gauss's law to a closed cylindrical surface of radius r and length l, we have $$E_W \times 2\pi r l = \frac{Q}{\epsilon_o}$$

$$E_W = \frac{Q}{2\pi\epsilon_o} \cdot \frac{1}{rl}$$

The potential difference between the surface of the wire at radius $r_w$ and the anode at radius $r_2$ is $$V = \int_r^r E dt$$

$$= \frac{Q}{2\pi\epsilon_o l} \ln\left(\frac{r_2}{r}\right)$$

So the electric field at the edge surface of the wedge is $$E_W = \left(\frac{V}{r}\right) \cdot \frac{1}{\ln\left(\frac{r_2}{r}\right)}$$

The electric field at the surface of the edge as compared with that at the surface of the tip is reduced by only a logarithmic factor of $1 n(r_2/r_w)$ if $r_w = r_2$. So the reduction is not severe at all. For sufficient electrons to be emitted, it is necessary to have $E_w > 2 \times 10^7$ volt/cm. For an edge thickness $2r_w$, we can estimate the voltage required to have a high current density emitted:

For $r_w = 0.5 \mu m$, $r_2 = 2.5 \mu m$ $V = 1.6$ kV
$r_2 = 10 \mu m$ $V = 3$ kV
$r_2 = 25 \mu m$ $V = 3.91$ kV

Let us now compare the total current emitted from a sphere of radius $r_t$ and a long wire with radius $r_w$ and length l. The current $I_t$ from the tip is $$I_t = 4\pi r_t^2 j$$

and the current from the long wire is $$I_w = 2\pi r_w l j$$

The mount of increase is $$R_w = I_w/I_t = \tfrac{1}{2} r_w, \quad r_t = r_w$$

If the edge of the wedge is formed as an ark of a circle, and $l = \tfrac{1}{2} D$, which is equal to half a circle with diameter D, we have $$R_W = \frac{\pi}{4} \frac{D}{r_W}$$

Some numerical values are:

$D = 10 \mu m$, $r_W = 0.5 \mu m$ $R_W = 15.7$
$D = 25 \mu m$, $r_W = 0.5 \mu m$ $R_W = 39.3$

Such a field emission wedge can be incorporated into the nozzle cells for charging up fluid as it passes through the nozzle. This illustrated in FIG. 8. In FIG. 8a, we schematically outline the liquid jet 200 coming out from the nozzle 204. The nozzle 204 is basically made up of an insulator 206, as shown in FIGS. 8b and 8c, with a metal layer or edge 210, such as molybdenum tungsten, or silver deposited on the insulator 206. The insulator 206 can be glass, epoxy, or silicon. Metal layer 210 is deposited on the insulator 206, with a thickness of $2r_w$, either on the inside of the cell 202 as depicted in FIG. 8b, or just outside the cell as in FIG. 8c. The insulator 206 is only partly covered with the metal layer 210, as can be seen from FIG. 8d. In this case the metal layer 210 extends around half of the nozzle hole 212, and covers the left side of the nozzle 204 as shown. An anode, in the form of a metallic plate or wire 214 may be attached to the right side of the nozzle 204 such that a potential difference may be applied between the plate 214 and the layer 210 to induce field emission from the metal layer 210. As electrons are emitted from the metal layer 210 on the left, they will travel across the nozzle hole 212 to the right and, prior to reaching the plate 214 a substantial portion of the electrons will be carried out of the nozzle 204 by out flowing fluid.

Figure 9:
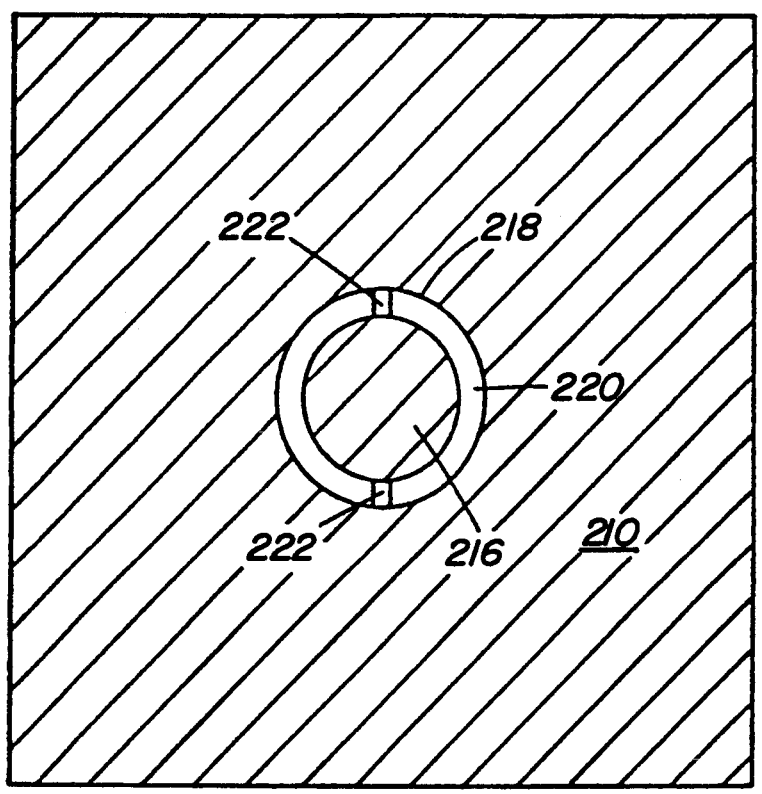
FIG. 9 is a front view of a nozzle for charging a liquid jet.

If even more current is required, the nozzle 204 may instead be formed so as to maximise the area over which the edge of the metal layer 210 extends, such as by the arrangement shown in FIG. 9. In this case a central disc will form an anode 216, and electrons will flow from the wedge-shaped edge 218 of the metal layer 210 which concentrically surrounds the anode 216, towards the anode 216. The anode 216 is secured in position by insulating blocks 222 so as to define a hole 220 between the anode 216 and the surrounding metal layer 210, through which fluid may pass. As electrons are emitted from the wedge-shaped edge 218 and moved across the hole 220 to the anode 216, they will be carried by the fluid that flows through the hole 220, out of the nozzle 204.

Therefore, the above mentioned nozzle construction incorporating a field emission/ionisation edge may be used to more effectively charge fluid as it passes from nozzle cells, than the previously described method of generating field emission from a tip.

The electron density at the nozzle mouth is given for either of the above techniques for charging the fluid exiting the nozzle cell as $$n_e = \frac{j}{ev_e} \quad (23)$$

which is inversely proportional to the velocity of the electron $v_e$ desired so as not to disturb the molecular binding. As the current density (j) is conserved, the follow equality results.

(j) before nozzle mouth = (j) after nozzle mouth (24)

$$n_e{}^t v_e{}^t = n_e v_e$$

$n_e{}^t$ = electron density before nozzle mouth
$n_e{}^t$ = velocity of electron before nozzle mouth
$n_e$ = electron density after nozzle mouth
$v_e$ = velocity of electron after nozzle mouth So the density of excess electrons $n_e{}^t$ in the beam after exiting the nozzle is increased by a factor of the ratio of $v_e{}^t/v_e$, the velocity of electrons in the liquid before the nozzle and after leaving the nozzle. This factor can be as much as $10^3$.

In order to have a large no it is better to discharge the electrons slowly near the nozzle mouth. The ratio of the electron density to the neutral density is $R_e$ where $$R_e = \frac{n_e}{n_o} \quad (25)$$

$n_o$ = density of atoms in the liquid $\sim 2 \times 10^{22}$/cm$^3$ (He).

The energy per atom $E_a$ in the liquid jet after passing through the nozzle is given by $$E_a = R_e e \Phi_o \quad (26)$$

where $\Phi$ is the accelerating voltage after the beam emerges from nozzle. For the case in which the beam is formed of clusters, some values of energy per atom are listed in the table below.

TABLE II

| | Energy per Helium Atom in Helium Cluster after Acceleration by $\phi_o$ (volt) | | | | |
|---|---|---|---|---|---|
| $V_c$ cm/sec | 1 | 10 | $10^2$ | $10^3$ | $10^4$ |
| $n_c$/cm$^3$ | $6 \times 10^{10}$ | $6 \times 10^{19}$ | $6 \times 10^{18}$ | $6 \times 10^{17}$ | $6 \times 10^{16}$ |
| $R_c$ | $3 \times 10^{-2}$ | $3 \times 10^{-3}$ | $3 \times 10^{-4}$ | $3 \times 10^{-5}$ | $3 \times 10^{-6}$ |
| $E_a$ (eV) | $e\phi°$ = | | | | |

TABLE II-continued

| Energy per Helium Atom in Helium Cluster after Acceleration by $\phi_o$ (volt) | | | | | |
|---|---|---|---|---|---|
| 1 keV | 30 | 3 | 0.3 | 0.03 | 0.003 |
| 10 keV | 300 | 30 | 3 | 0.3 | 0.03 |
| $10^2$ keV | 3 keV | 300 | 30 | 3 | 0.3 |
| 1 MeV | 30 keV | 3 keV | 300 | 30 | 3 | where
$V_c$ is the velocity of the electrons after expansion
$n_c$ is electron density at nozzle mouth
$R_c$ is the ration of electron density to neutral density
$E_a$ is energy per atom after expansion through nozzle mouth where
$V_e$ is the velocity of the electrons after expansion
$n_e$ is electron density at nozzle mouth
$R_e$ is the ration of electron density to neutral density
$E_a$ is energy per atom after expansion through nozzle mouth For a greater number of beams of charged particles, a plurality of nozzle mouths (126) with a plurality of centrally located tips (124) may be provided in one nozzle cell. These tips (124) would preferably be separated from each other but would all communicate with nozzle cell (112) for a common source of liquid. Since the size of tip (124) cannot be enlarged without diminishing the field emission effect, a way of increasing current is to have many tips with many nozzle mouths (126) defined in one nozzle face (120).

For the case in which the nozzle is dimensioned to form a liquid jet, and provided the neutral to charged ratio R in the liquid jet is small enough so that, for a narrow liquid jet, the Coulomb repulsion is not enough to break up the cohesive force of the liquid, then the beam will form a charged liquid jet, and the accelerated charges will effect an acceleration of the jet itself. Under such an acceleration the jet will eventually break into smaller droplets which, in a vacuum, will freeze to form solid droplets or microparticles, having a diameter of the order 10/tin which then form the beam. For $R=10^7$ or charge density $n \sim 2 \times 10^{15}/cm^3$, and neutral density $n_o \approx 2.2 \times 10^{22}/cm^3$, a liquid nitrogen beam with radius 20 $\mu$m will remain as a liquid jet prior to acceleration. Normally, in high energy accelerators, the ions forming ion beams behave like gas particles, and a density $10^8/cm^3$ (or at most $10^{10}/cm^3$) is necessary to avoid space charge effect. In a charged liquid jet, we have (1) The charged density is at least five orders of magnitude larger than an ordinary ion beam.

(2) The neutral density $n_o \approx 2.2 \times 10^{22}/cm^3$ is $10^{12}$ or one trillion times denser than that of an ion beam.

(3) Because it is charged, it can be accelerated to higher energy as well.

The following set of parameters can be set at the source where the charged liquid nitrogen jet is created
$r_t = 5$ $\mu$m = radius of the tip
$l_g = 20$ $\mu$m = gap between the tip and the nozzle
$V_a = 30$ tv = voltage between the tip and the nozzle
$D = 20$ $\mu$m = diameter of the nozzle The resulting electric field $E_v$ current density $j_v$ charge density $n(r_t)$, and current I at the tip are calculated to be
$E_t = 1.67 \times 10^7$ V/cm
$j_t = 2.28 \times 20^3$ Amp/cm$^2$
$n_-(r_t) = 1.06 \times 10^{17}/cm^3$
$n_-(lg) \approx 2.5 \times 20^{16}/cm^3$ = charge density at the nozzle
$I = 0.9$ mA
$R = n_o(lg)/n_-(lg) = 10^6$ The charged droplets or microparticles of the liquid jet can further be accelerated by a linear accelerator to $eVo = 10$ GeV. The power in one such beam is $$P_1 = IVo = 10^7 \text{ watts}$$

Requirement for magnetic fusion is $$P = 50 \sim 70 \text{ MW}$$

The number of liquid jet beams is $$N_b = \frac{P}{P_1} \approx 7 \text{ beams}$$

These $N_b$ beams can be easily created by having $N_b$ tips and $N_b$ nozzles, the beams being together accelerated in the same cavity of the linear accelerator. The length l of the linear accelerator depends on the accelerating gradient Eo. If Eo=20 MeV/m, then $$l = \frac{Vo}{Eo} \approx 500 \text{ meters}$$

The energy per nitrogen molecule $E_m$ at the end of acceleration is $$E_m = \frac{eVo}{r} = 10 keV$$

To form the increased number of liquid jet beams, a plurality of nozzle mouths (126) with a plurality of centrally located tips (124) may be provided in one nozzle cell. These tips (124) are preferably be separated from each other but would all communicate with nozzle cell (112) for a common source of liquid. Since the size of tip (124) cannot be enlarged without diminishing the field emission effect, the way to increase current is to have many tips with many nozzle mouths (126) defined in one nozzle face (120).

Figure 4:
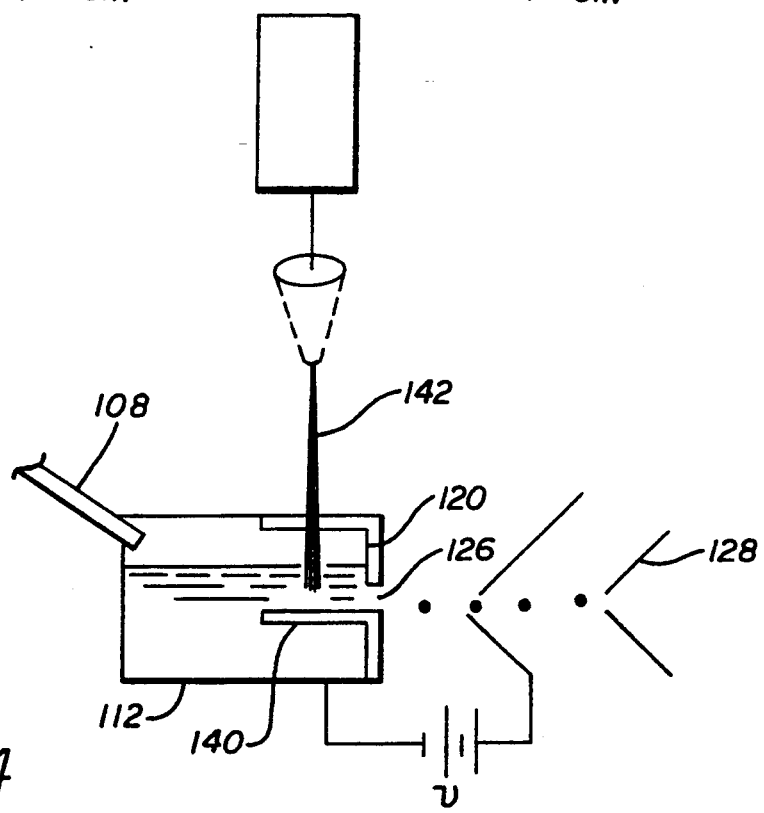
FIG. 4 is a diagrammatic view of a second embodiment of the nozzle portion of the invention, the tungsten wire being replaced by a photoelectric device.

Turning now to FIG. 4, a second embodiment of the invention is shown. In this graphic depiction, cryostat (100) and attachment means (110) have been omitted for the sake of simplicity. Instead, FIG. 4 shows tube (108) as it enters nozzle cell (112). In this embodiment, nozzle cell (112) again includes nozzle face (120) and nozzle mouth (126). Skimmers (128) are diagrammatically depicted in the area of lower pressure. The dimensions of nozzle mouth (126) are the same as that noted above, that is from about 5 microns to 1 millimeter. Absent from FIG. 4, is plug (114), adjustable mount (116) and tungsten wire (122) and its tip (124). These are replaced by a photoelectric device now described.

Resting generally normally of, connected to, but insulated from nozzle mouth (126) is photocathode (140). This cathode is seen to extend inwardly from nozzle mouth (126) inside of nozzle cell (112). In communication with photocathode (140) is optical fibre (142) which passes outside of nozzle cell (112) to receive light waves transmitted through lens (144) by means of light source (146). In FIG. 4 a photoelectric effect is used to charge the liquid surrounding photocathode (140) prior to the liquid exiting the nozzle into the lower pressure area where skimmers (128) are located. This means of charging the liquid is advantageous since it may be used at low temperature. This facilitates maintaining the liquid at a cold temperature, and since it generates a high number of emitted electrons, a high current results. Commercially available cathodes of this type have the following characteristics:

TABLE 3

| | Cathod (Cs) Na₂KSb(S 20) | |
|---|---|---|
| Photo response | Wave length of Photons | Quantum efficiceny |
| 45 mA/watt | 632.8 nm (Ne—Cd laser) | 9% |
| 100 mA/watt | 253 nm (mercury lamp) | 30% |

However, the Cesuim (Cs) is easily damaged by impurities such as oxygen in the liquid. A more robust cathode will be a tungsten foil which has a work function $\phi=4.5$ eV, as compared with $\phi=2.14$ eV for Cs. The light source shown in FIG. 4 may well be a laser source or a mercury lamp to generate ultraviolet light. This source may be pulsed or shown continuously on the cathode. A much stronger laser pulse is needed if tungsten foil is used because the quantum efficiency of tungsten is many orders of magnitude smaller than for Cs. The intensity of the laser beam is determined by the foil material and the degree of strong coupling desired. Preferably, this should be of the order of 100 watts or more.

The electrons emitted from the cathode generally have the kinetic energy T equal to the difference of photon energy $\zeta$ and the work function of the metal $$T = \zeta\omega - \phi \quad (27)$$

$\omega$ = frequency of the photon

So the kinetic energy of the electron is generally of the order 1 eV, unless the photon energy is tuned to be just above the work function. If the photocathode (140) is immersed in the liquid, such as helium, and as shown in FIG. 4, then the electrons can be cooled off immediately to the temperature of the liquid. The kinetic energy of the electrons will be distributed throughout the liquid while only a small portion of the liquid will be squeezed off by pressure to nozzle. The electrons will be further attracted to nozzle mouth (126) by the external electric field applied by voltage (V).

This is shown in FIG. 4. The maximum charge density at nozzle mouth (126) is $$n_{max} = I/(\pi d^2 v/4) \quad (28)$$

I = current from photoelectric effect
d = diameter of nozzle mouth
v = velocity of the cluster at nozzle mouth which is obtained by assuming that all of the electrons eventually will pass out of the nozzle only through the nozzle mouth (126). The velocity v of the beam at the nozzle mouth (126) depends on the pressure applied to the liquid, for example helium. If we take $v = 10^3$ cm/sec, $d = 5$ μm, $I = 1$ mA, the maximum possible electron density is $n_{max} = 3.2 \times 10^{19}/cm^3$. This is quite a large number. At $T = 10^{-4}$ eV liquid helium temperature, the coupling $\Gamma$ is $7.5 \times 10^3$. Hence, when the beam is formed outside the nozzle, it is to be expected that the molecular binding will be greater than the Coulomb repulsion for the case in which the beam is a liquid jet, or alternatively the clusters will be strongly coupled clusters for the case in which the beam is a cluster beam. The photoelectric effect can only produce electrons, and cannot produce positively charged ions.

Figure 5:
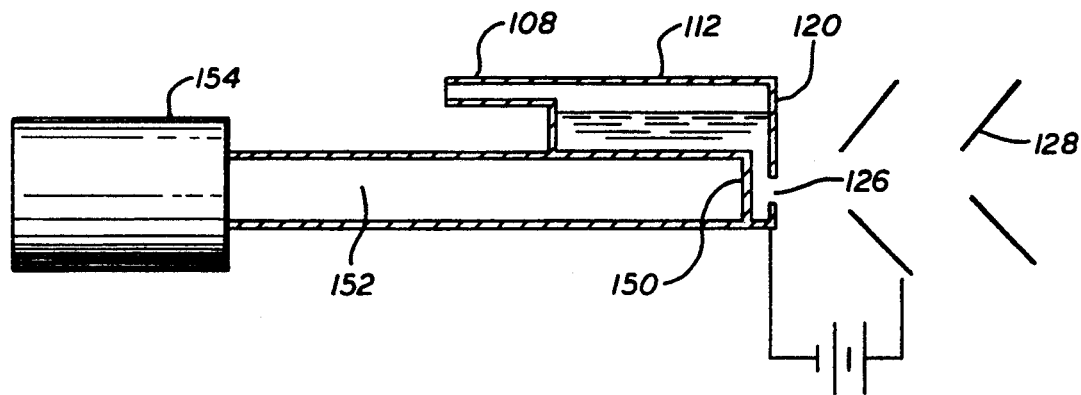
FIG. 5 is a diagrammatic view of a third embodiment of the nozzle portion of the invention, tungsten foil and an electron gun replacing the tungsten wire.

Reference is now made to FIG. 5. Here, as in FIG. 4, the cryostat (100) and attachment means (110) are omitted for the sake of simplicity. Tube (108) which initially was charged with a gas, preferably a purified gas, at the top of cryostat (100), is again shown in its connection with nozzle cell (112), at which point the gas has condensed into a liquid and empties into nozzle cell (112). Nozzle face (120) connects to nozzle cell (112) and defines as before, nozzle mouth (126). Nozzle mouth (126) has the same dimensions noted above. As in FIG. 4, absent from FIG. 5 is plug (114), adjustable mounting (116), tungsten wire (122) and tip (124). Instead, FIG. 5 illustrates an electron beam to charge the liquid in nozzle cell (112) which is now described. An ion beam may be used instead of an electron beam.

Opposite nozzle mouth (126) is tungsten foil (150) which forms a dividing wall of nozzle cell (112). Connected to nozzle cell (112) and tungsten foil or film (150) is a vacuum tunnel (152). As can be seen in FIG. 5, vacuum tunnel (152) is isolated from nozzle cell (112) such that the pressure in nozzle cell (112) is not affected by the vacuum in vacuum tunnel (152). An electron gun (154) familiar to those skilled in the art, is connected to and communicates with vacuum tunnel (152). Electrons are fired from electron gun (154) in pulses or continuously through vacuum tunnel (152) and against tungsten foil (150). The electrons are insulated by vacuum tube (152) from nozzle cell (112). The electrons are shot at film (150) as liquid is pumped through nozzle cell (112), out of nozzle mouth (126), and into the vacuum area where skimmers (126) are situated. Nozzle mouth (126) is again positively biased by known means. Connecting skimmers (128) to a voltage source is again also contemplated.

The energetic electron beam (which can be substituted by an ion beam of He+ or Ar+) is generated in the electron gun and injected into the liquid, such as helium, through the thin tungsten film (150). A tough thin metallic film, like tungsten film (150), is necessary to separate the vacuum tube (152) through which the electron/ion must travel to the liquid helium. The kinetic energy of the electron/ion beam must be high enough to penetrate the tungsten film (150). The electron range is given by:

$$R = AT[1 - B(1 + CT)]$$

A = 0.55 mg/(cm² keV)
B = 0.984
C = 0.003 keV⁻¹
T = kinetic energy of the electron in keV
where a, A, B, and C arc parameters as found in "Review of Particle Properties", Physic. Letters, Vol 170B, April 1986.

Numerically, they may have the values

| T: | 30 keV | 40 keV | 50 keV | 100 keV |

| R: | 1.6 mg/cm² | 2.67 mg/cm² | 3.97 mg/cm² | 13.37 mg/cm² |

For a tungsten foil of thickness d=5 μm, density 4.5 mg/cm³, the range is 2.25 mg/cm². So an electron beam of 40 keV can then penetrate through a 5 μm foil and still ionize the liquid helium to produce both electrons and He+. Provided that an electric field is applied by voltage (V), the electron and positive ion He+ produced from ionization will not recombine. For each highly energetic electron, more than one electron and ion at liquid helium temperature may be produced.

The foil (150) should be as close to nozzle mouth (126) as possible with the space therebetween being about 30 microns to 1 mm. The space between the foil (150) and the nozzle mouth (126) (the gap (g)) should be wide enough that the liquid which lies therebetween is able to stop electrons emanating from the foil (150) so that the electrons do not pass out of the nozzle mouth (126) without stopping.

$$g > (R - R_w)/\rho \tag{30}$$

where
$R_w$=decrease of range due to tungsten
$\rho$=density of liquid helium
R=range of electrons For a numerical example for the above-given formula, one may choose g>30 micro meters. Then, all of the electrons will be stopped between the nozzle mouth (126) and foil (150). The electrons and ions as they are emitted from the foil are also very close to nozzle mouth (126).

An external voltage of, say, 5 kV or more is maintained between nozzle mouth (126) and tungsten foil (150). If nozzle mouth (126) is maintained at a positive voltage with respect to tungsten foil (150), electrons will be attracted toward nozzle mouth (126). The beam formed beyond nozzle mouth (126) will contain excessive electrons and will be negatively charged. If the polarity is reversed so that nozzle mouth (126) is negative with respect to foil (150), ions will be attracted to nozzle mouth (126). The beam will be positively charged.

The same kind of effect can be obtained by replacing the electron beam with an ion beam. Generally, the electron beam should be at least 1 micro Amp to 1 milli Amp in intensity and it should be focused on the foil to a point of no less than 1 millimeter. The exact intensity of the beam depends upon the type of coupling between the molecules desired. The stronger the beam, the stronger the coupling.

Figure 6:
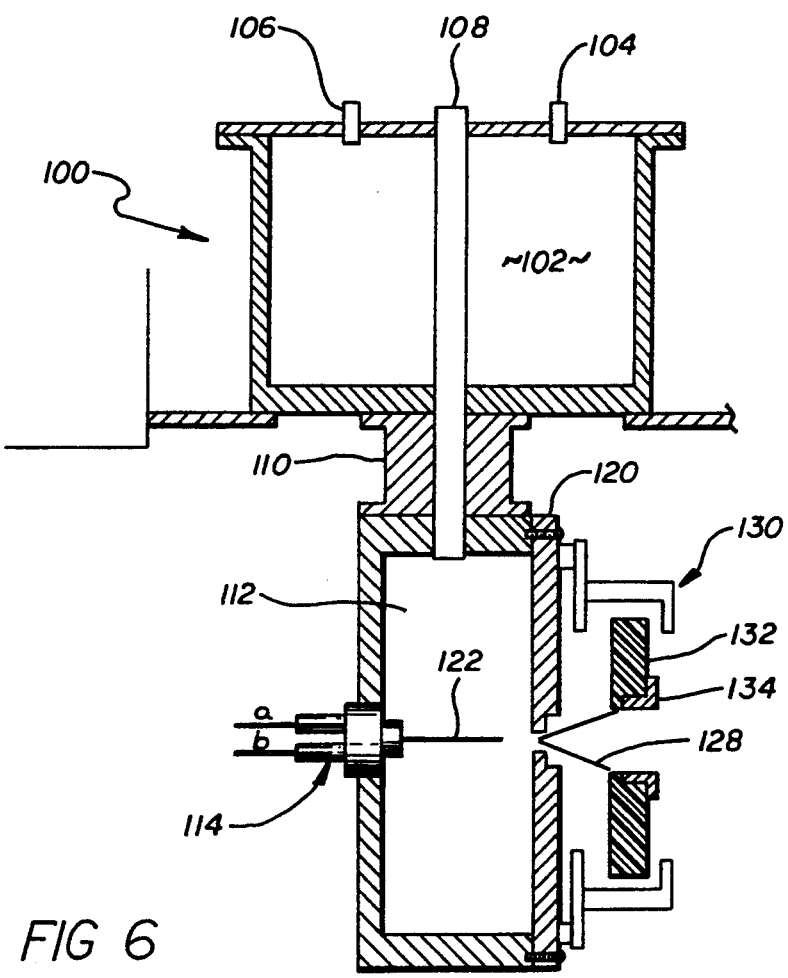
FIG. 6 is a view similar to that of FIG. 1, a tungsten wire being shown immersed in liquid.

A last method of charging the liquid is depicted in FIG. 6. Here thermionic emission of electrons is used. A tungsten wire (122) is used to generate electrons in the liquid before the liquid passes through nozzle mouth (126). In this instance, the tungsten wire (122) of approximately 0.005" thickness is immersed in the liquid, such as liquid nitrogen. Electric current is then passed through the wire (122) and heat is thereby generated heating the wire (122). Due to the poor conductivity of the liquid nitrogen, the liquid around the wire (122) will be heated and a gas bubble will form around the wire. There will then be a temperature gradient between the gas bubble and the surrounding liquid nitrogen. Electrons will be emitted by the normal thermionic emission, and will be attracted by the positively biased potential maintained at nozzle mouth (126). For this method, the set up shown in FIG. 1 is generally applicable, the tungsten tip (124) as well as adjustable mounting (116) being replaced by a simple non insulated tungsten wire (122). Thermionic emission is shown to work in superfluid helium to yield a total current of one microamp. The reader may wish to review Glen E. Spangler and F. L. Hereford: "Injection of electrons into HeII from an Immersed Tungsten Filament". Phys. Rev. Lea. V. 20 1229 (1968). The tungsten wire can also be substituted by a latham compound such as $LaB_6$ or other electrical element with a low work function.

The above described method may be practical such that the liquid within the nozzle cell 112 is charged by tip 124, and forced to pass through the nozzle mouth 126 into a vacuum to form a liquid jet or beam, or otherwise such as to form a cluster beam. The vacuum is, however, not an essential feature, and the liquid may instead be forced through the nozzle mouth 126 into an atmosphere, provided the atmospheric pressure is lower than that existing within the nozzle cell 112.

Figure 7:
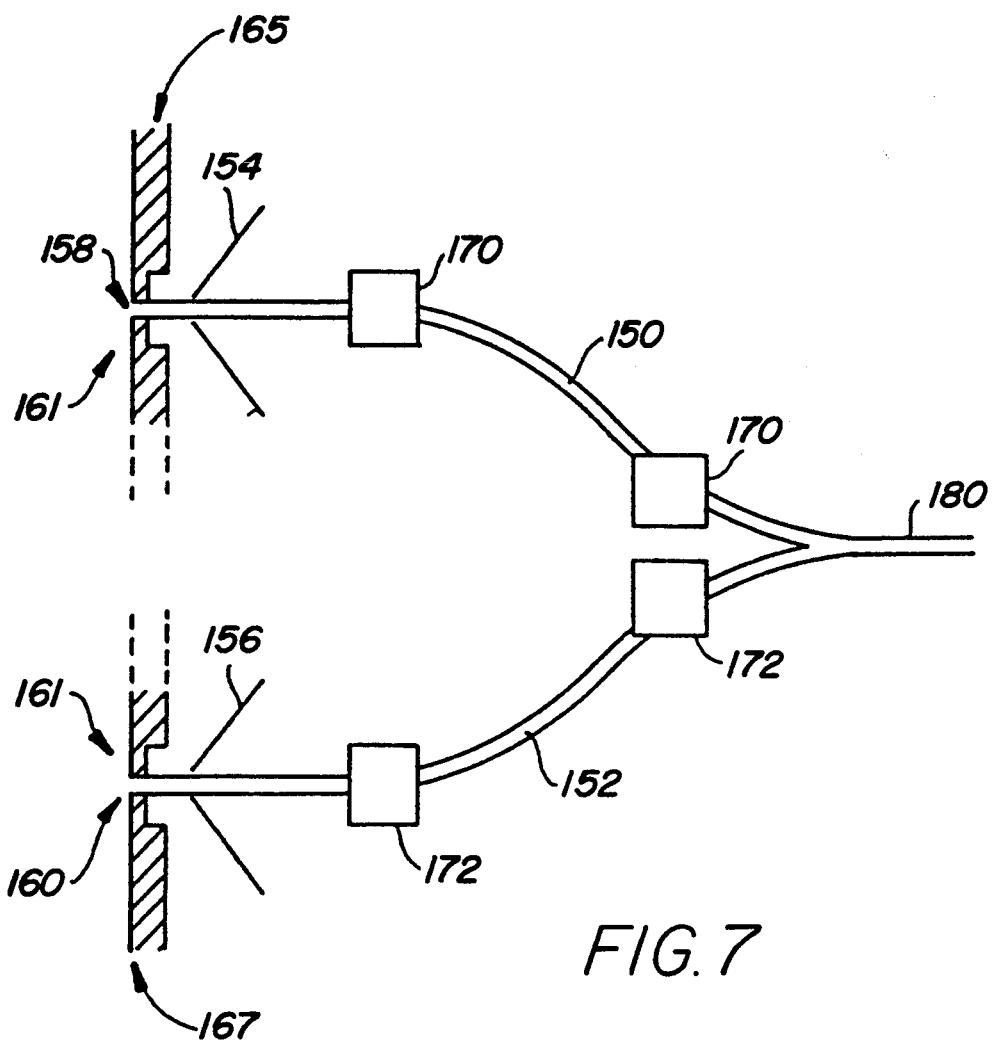
FIG. 7 is a diagrammatical view of apparatus for creating a neutral beam.

Using the above described method of forming liquid jets or clusters, it is possible to combine two oppositely charged jets or beams of liquid droplets or microparticles or cluster beams formed therefrom to form a neutral beam such as shown in FIG. 7, wherein the cells are similar to those previously described. For simplicity, only the section depicting the nozzle and skimmers is shown.

As described above, beams of opposite charge may be formed by the introduction of positive ions generated, for example, by field ionisation from a tip 158, into a fluid as it exits the cell 165 through nozzle 162 to form a positively charged beam 150. A further cell 167 similar to those used in previous embodiments may be used to generate a negatively charged beam 152. The two beams 150, 152 pass through skimmers 154 and 156 respectively.

The path of the beams 150, 152 may be altered by a series of electrically charged elements 170 and further electrically charged elements 172. The elements 170, 172 are effective to direct the charged beams 150, 152 so as to converge whilst maintaining motion of the beam away from the cells 165, 167. The charge associated with one beam will cancel with the opposite charge associated with the other beam such that, on combination, a neutral beam 180 will result.

Since the resultant beam 180 is neutral, it cannot be accelerated, and it is therefore necessary to accelerate the individual charged beams up to the required energy prior to combination into beam 180.

Figure 7A:
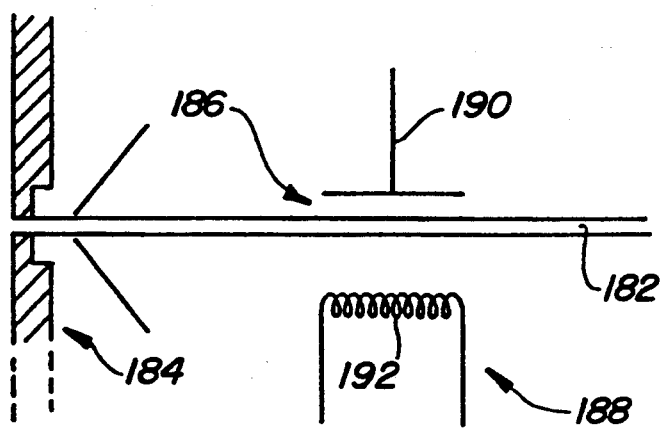
FIG. 7a is a diagrammatical view of apparatus for creating a neutral beam.

Alternatively, a charged beam may be neutralised by introducing into the beam, low energy ions having a charge sign opposite to that of the beam. This method is depicted in FIG. 7a, wherein a charged beam 182 is formed in a vacuum 186 after passing from a nozzle cell 184. The beam 182 passes between an ion generated 188 and an electrode 190. The ion generator 188 may be in the form of a heated element 192 which emits low energy electrons. The electrons are accelerated toward the electrode 190, which, in the case that the generator is emitting electrons, is an anode. The beam 182 is in this instance positively charged, and generator 188, and element 192 are arranged about the beam 182 so that electrons accelerated from the generator 188 can pass into the beam 182, whereat the negative charge of the electron will cancel a corresponding positive charge of the beam 182. In this manner, neutralization of the beam will result, upon the introduction of sufficient electrons to the beam 182.

The above described method of neutralizing a beam may also be applied in the case where the beam is negatively charged by providing an ion generator 188 which produces positive ions for introduction into the beam.

It is also desirable, if charged beams are accelerated in a vacuum, to ensure that solidification of the fluid does not occur prior to combination. This can be achieved by having a low pressure present in the acceleration region, ensuring the rate of heat evaporated from the fluid is reduced, the fluid thereby remaining in the fluid state rather than cooling to a solid.

If liquid helium is used in the nozzle cell, the liquid jet may be formed of superfluid helium, the beam then consisting of coherent helium, and nuclear fusion can proceed via a coherent mechanism as well.

Liquid jets and the resultant beams, as described here, may be used in nuclear fusion processes, with the advantage over present techniques of laser implosion and inertia confinement fusion (ICF) of not preheating the deuterium target, since there are no accelerated electrons as resulting from a laser-deuterium interaction. A deuterium-deuterium collison does not break loose electrons and create ionized plasma. The electrons are ionized only when whole deuterium under great pressure heats up together adiabatically.

Further, because of the extremely high intensity of the liquid jet, it can be used alone to assist the nuclear fusion process in magnetic confinement schemes such as in Tokamak.

Beams generated with charged clusters as discussed herein have three distinct applications:

(1) Cutting Steel or Other Hard Objects. When liquid nitrogen is used in nozzle cells, it can be expanded into the ordinary atmospheric environment with some applied pressure. If the energy per nitrogen atom is above 0.1 eV, which is equivalent to one thousand degree $10^3$ 20 K., the nitrogen cluster can cut all kinds of objects: metal, steel, rock, human tissues, ore, yen diamond. The power consumption is small. For a current of 1 mA and applied voltage $\phi_o = 10$ kV, the power needed is 10 watts. This is to be compared with lasers, which consume kilowatts, or kW above, in power. Liquid nitrogen is readily available and very economical. Liquid nitrogen is also cold.

For many applications where high temperature beams such as those composed of flames, ions or plasma are to be avoided, this method is useful.

(2) For energy per atom $E_a$ above 6 eV, which is equivalent to 2 MB pressure when stopped, a liquid hydrogen cluster beam can be used to create metallic hydrogen. Six beams of liquid hydrogen can be shot together to a cube of solid hydrogen. The cube under extreme pressure from these six beams will form metallic hydrogen. The metallic hydrogen is superconducting at room temperature.

(3) For energy per atom $E_a$ above 100 eV, and preferably 1 keV, deuterium cluster beams formed from liquid deuterium, or helium cluster beams formed from liquid helium can be used to create nuclear fusion. Six beams can be arranged to impact on a solid cube of deuterium.

Strongly coupled cluster beams, as described here, have advantages over laser implosion technique on inertia confinement fusion (ICF) because they do not preheat the deuterium target since there are no accelerated electrons as resulting from a laser-deuterium interaction. A deuterium-deuterium collision does not break loose electrons and cream ionized plasma. The electrons are ionized only when whole deuterium under great pressure heats up together adiabatically.

Further, because of the extremely high intensity of the strongly coupled cluster beam, it can be used alone to assist the nuclear fusion process in magnetic confinement schemes such as in a Tokamak.

If the liquid helium in the nozzle cell is superfluid helium, the helium clusters then consist of coherent helium and nuclear fusion can proceed via a coherent mechanism as well.

The inventor teaches the creation of clusters that are strongly or weakly coupled, that are coherent, and that are neutral or charged, these clusters being formed from either a liquid or a gas, that is a fluid. While throughout this description, the term liquid is most often used when describing this invention, it is to be understood that the invention is equally applicable to gases. It is merely that the prior art does not disclose the formation of clusters from liquids, that the present disclosure has been written to draw the attention of the reader to the fact that this invention contemplates cluster formation from liquids as well as gases. The two may be generally referred to as fluids.

In the prior art known to the inventor, and in particular that disclosed by Friedman and in the Brookhaven experiments, the use of liquid for forming clusters is not disclosed and the forming of charged clusters prior to to during their formation in a fashion that does not destroy the coupling or coherency of the clusters is not disclosed. The known art forms clusters from gases, super saturated gases, or superfluid helium and either charges the clusters significantly after formation or if it charges the clusters before formation, does so with electric arcing which disturbs the coupling of the clusters. To charge a fluid, that is a liquid or a gas, as taught by applicant, an element with a low work function is used to slowly emit the desired charge so that the coupling of the clusters is not disturbed.

Some of the fluids the inventor uses to form clusters, are water ($H_2O$), heavy water ($D_2O$), liquid nitrogen, liquid deuterium, liquid helium, liquid oxygen, and liquid hydrogen. The advantages of forming each of these liquids into clusters are enumerated below. The advantage of forming the clusters from a liquid rather than a gas is that the density of liquid (except liquid helium) is generally 800 to 10,000 times more than the density of the liquid in a gaseous state at boiling point. Thus clusters formed from a liquid as disclosed herein, are larger in both size and number. With such an increase, a much more intense cluster beam is created as the liquid formed clusters are sprayed out of the nozzle mouth. Cluster beams from said spraying have been measured in intensity of 0.1 eV per atom which is equivalent to tens of kilobars of pressure or one $10^4$ atmospheres of pressure. With the exception of liquid helium, the pressure in the nozzle cell need only be about 1 atmosphere or above. For liquid helium the pressure should be 10–100 atmospheres or above. The formation of helium clusters from superfluid helium is known in the art and not elaborated upon here.

a) Water

This is the cheapest and most easily obtainable commodity. When water clusters are accelerated to an energy per molecule of $E_a > 0.1$ eV. Accelerated in this fashion, the clusters can be used to cut metal or drill holes in rock. Further, the pressure used outside of the nozzle mouth in the above examples does not have to be a vacuum, as long as the initial pressure on the water in the nozzle cell is significantly above one atmosphere. The water can be at room temperature or below when passing it from the nozzle cell to the outside area of lower pressure. The water should preferably be pure so that it does not clog nozzle mouth (126).

b) Heavy Water

Replacing hydrogen by deuterium in water increased the cost enormously. But at sufficiently high energy, $E_a > 300$ eV, these heavy water clusters can ignite fusion as the Brookhaven group has shown. Again, as above, the heavy water may be at room temperature or below and the pressure outside nozzle mouth in the area of skimmers need not be vacuum pressure.

c) Liquid Nitrogen

Liquid nitrogen is very cold when compared with water. In industrial situations where cold treatments are preferable, liquid nitrogen can be substituted for water. Liquid nitrogen is still relatively inexpensive, and can be handled cyrogenically rather easily. Vacuum pressure is required outside of the nozzle mouth to keep the nitrogen cool.

d) Liquid Hydrogen

Energetic hydrogen clusters ($E_a > 20$ eV, or pressure $> 2$ MB [megabar]) formed from liquid hydrogen can be used to create superconducting metallic hydrogen. Vacuum pressure is required outside of the nozzle mouth.

e) Liquid Deuterium

Liquid deuterium is far purer than heavy water as it contains only deuterium atoms. In some applications, pure deuterium clusters formed from liquid deuterium may be preferable to ignite nuclear fusion. Vacuum pressure is required outside of the nozzle mouth.

f) Liquid Helium

Coherent helium cluster can be obtained from liquid helium in the source nozzle cell and hence are very valuable as research tools as well as for industrial application. Vacuum pressure is required outside of the nozzle mouth.

Charged cluster beams formed as disclosed herein may be accelerated by an external electric field. This field will not destroy the strong coupling of the clusters. The result will be an extremely intense, energetic, strongly coupled cluster beam having a low energy spread.

The described arrangement has been advanced by way of explanation only and many modifications may be made thereto without departing from the spirit and scope of the invention as defined in the appended claims.

I claim:

1. A method of producing a charged beam of coherent or strongly coupled clusters comprising passing a liquid through a nozzle to form the beam, the method including charging said liquid so that the charging minimizes or eliminates the destruction of the strong coupling or coherency of said clusters in said beam, with a charge density is provided by at least $10^{12}$ charge per cm$^3$.

2. A method as claimed in claim 1 wherein the beam is accelerated.

3. A method as claimed in claim 1 wherein the beam is formed as a liquid jet.

4. A method as claimed in claim 3 wherein the liquid jet is accelerated to form a beam of liquid droplets.

5. A method as claimed in claim 3 wherein the liquid jet is accelerated and cooled to form a beam of microparticles.

6. A method as claimed in claim 3 wherein the liquid forming the liquid jet is coherent.

7. A method as claimed in claim 3, wherein the charging is effective to establish a ratio of neutral particles to charged particles to be less than $10^{12}$, while allowing the molecular binding among the molecules of the liquid to be maintained.

8. A method as claimed in claim 1 wherein the beam is formed as a cluster beam.

9. A method as claimed in claim 1 wherein the charge density is at least $10^{16}$ charge per cm$^3$.

10. A method as claimed in claim 1, wherein the charged beam is neutralised by introducing into the beam, charge of opposite sign to that of the charged beam.

11. A method as claimed in claim 1, wherein a plurality of charged beams are formed.

12. A method as claimed in claim 11 wherein charged beams of opposite charge are formed and accelerated, the accelerated beams being combined to form a neutral beam.

13. A method as claimed in claim 1, wherein the beam is formed by passing liquid which makes up said beam from an area of first pressure to an area of second pressure, said second pressure being lower than said first pressure.

14. A method as claimed in claim 13 wherein the charging of said liquid is effected by a photoelectric device.

15. A method as claimed in claim 14 wherein said photoelectric device comprises a photocathode placed in the liquid, an optical fibre communicating with said photocathode, and a light transmitting light waves through a lens to said optical fibre.

16. A method as claimed in claim 15 wherein said light is generated by a laser.

17. A method as claimed in claim 13 wherein the charging of said liquid is effected by an electron beam.

18. A method as claimed in claim 17 wherein the liquid is in a nozzle cell, said nozzle cell being attached to a vacuum tube which communicates with an electron gun such that the vacuum tube carries an electron beam emitted from said gun, a tungsten foil being connected between said nozzle cell and said tube, in the line of said beam fired from said, gun such that, upon firing the beam of electrons on said foil, the liquid in said nozzle cell near said foil is charged.

19. A method as claimed in claim 13 wherein the charging of said liquid is effected by an ion beam.

20. A method as claimed in claim 19 wherein the liquid is in a nozzle cell; a vacuum tunnel isolated from said nozzle cell is attached to said nozzle cell and communicates with an ionising device for carrying the ion beam emitted from said device; a tungsten foil is connected between said nozzle cell and said tunnel and is in the line of said beam fired from said device such that upon firing the beam of ions on said foil the liquid in said nozzle cell near said foil is charged.

21. A method as claimed in claim 13 wherein said area of first pressure is at least one atmosphere in pressure.

22. A method as claimed in claim 21 further comprising the step of charging said liquid prior to the exit of said liquid into said second area, said charging being done so as not to destroy the coupling of said liquid as it forms into a liquid jet while it passes from said first area to said second area.

23. A method as claimed in claim 13 wherein said area of second pressure is a vacuum.

24. A method as claimed in claim 13 wherein the charging comprises passing the liquid between two conductive elements having edges opposingly arranged so as to define a gap therebetween, and a means for applying a voltage across the gap so as to effect a potential difference between said conductive elements, one of said conductive elements having an edge width, adjacent said gap, wherein the width of the edge of said one of said conductive element, is sufficiently small enough to cause a locally intensified electric field to be established adjacent the edge such that field emission or ionisation is effected upon application of the voltage, so that ions generated from the one of said conductive elements travel towards the other conductive element under the influence of the applied potential difference.

25. A method as claimed in claim 24 wherein the edge width adjacent said gap is substantially smaller than the width of the edge of the opposingly arranged conductive element.

26. A method as claimed in claim 25 wherein the conductive elements are located substantially adjacent said nozzle.

27. A method as claimed in claim 25 wherein the conductive elements are integral with said nozzle.

28. A method as claimed in claim 13, wherein the beam is directed to be incident upon a material capable of undergoing nuclear fusion, whereby to impart sufficient energy to the material to cause fusion of said material to occur.

29. A method as claimed in claim 1 wherein the charging of said liquid is effected by an electrically conductive element having a low work function placed in the liquid.

30. A method as claimed in claim 29 wherein said electrically conductive element is a tungsten wire having a tip, said wire charging said liquid by means of a field emission or field ionisation method.

31. A method as claimed in claim 29 wherein said electrically conductive element is heated by passing electric current through it, said heating causing the liquid to be vaporised just around the electrically conductive element, said vapour serving as insulation to inhibit transmission of heat to the rest of the liquid.

32. A method as claimed in claim 31 wherein said electrically conductive element is a tungsten wire placed in the liquid, said tungsten wire charging said liquid thermionically.

33. A method as claimed in claim 29 wherein said electrically conductive element is comprised of $LaB_6$ and the liquid is charged by means of field emission or field ionisation from the electrically conductive element so that the electrons emanate slowly from said tip of said electrically conductive element, the velocity (u) of said electrons as they emanate from said tip being a function of $$u = \mu E$$

where $\mu$ is the mobility and E the electric field at tip.

34. A method as claimed in claim 1, wherein the liquid is liquid helium.

35. A method as claimed in claim 1, wherein the liquid is liquid nitrogen.

36. A method of charging clusters comprising charging said clusters as they are formed by passing fluid which makes up said clusters from an area of first pressure through a nozzle defining a nozzle mouth, said nozzle maintaining the fluid at said first pressure to an area of second pressure, said second pressure being lower than said first pressure, said charging being such that it does not destroy the strong coupling of said clusters, the means for charging said clusters being an electrically conductive element having a low work function such as found in tungsten wire and latham compound $LaB_6$, said element being placed in the fluid which is to be formed into said clusters.

37. The method of claim 36 wherein said electrically conductive element is a tungsten wire having a tip, said wire charging said fluid by means of a field emission method.

38. The method of claim 36 wherein said electrically conductive element is heated by passing electric current through it, said heating causing the fluid which is to be formed into said clusters to be vaporised just around the electrically conductive element, said vapour serving as insulation to inhibit transmission of heat to the rest of the fluid.

39. The method of claim 38 wherein said electrically conductive element is a tungsten wire placed in the fluid which is to be formed into said clusters, said tungsten wire to charge said fluid thermionically.

40. The method of claim 36 wherein said electrically conductive element is comprised of $LaB_6$ and is charged by means of a field emission method so that the electrons emanate slowly from said tip of said electrically conductive element, the velocity (u) of said electrons as they emanate from said tip being a function of $$u = \mu E$$

where $\mu$ is the mobility and E the electric field at tip.

41. The method of claim 36 wherein the means for charging said clusters is a photoelectric device.

42. The method of claim 41 wherein said photoelectric device comprises a photocathode placed in the fluid which is to be formed into said clusters, an optical fibre communicating with said photocathode, and a light transmitting light waves through a lens to said optical fibre.

43. The method of claim 42 where said light is a laser.

44. The method of claim 36 wherein the means for charging said clusters is an electron beam.

45. The method of claim 44 wherein the fluid which is to be formed into said clusters is in a nozzle cell; a vacuum tunnel isolated from said nozzle cell is attached to said nozzle cell and communicates with an electron gun for carrying the electron beam emitted from said gun; a tungsten foil is connected between said nozzle cell and said tunnel and is in the line of said beam fired from said gun such that upon firing the beam of electrons on said foil the fluid in said nozzle cell near said foil is charged.

46. The method of claim 36 wherein the means for charging said clusters is an ion beam.

47. The method of claim 46 wherein the fluid which is to be formed into said clusters is in a nozzle cell; a vacuum tunnel isolated from said nozzle cell is attached to said nozzle cell and communicates with an ionising device for carrying he ion beam emitted from said device; tungsten foil is connected between said nozzle cell and said tunnel and is in the line of said beam fired from said device such that upon firing the beam of ions on said foil the fluid in said nozzle cell near said foil is charged.

* * * * *